United States Patent
Koizumi

(10) Patent No.: US 7,379,213 B2
(45) Date of Patent: *May 27, 2008

(54) OUTPUT IMAGE ADJUSTMENT OF IMAGE DATA

(75) Inventor: Takahiko Koizumi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 580 days.

This patent is subject to a terminal disclaimer.

(21) Appl. No.: 10/503,843

(22) PCT Filed: Jul. 10, 2003

(86) PCT No.: PCT/JP03/08809

§ 371 (c)(1),
(2), (4) Date: Aug. 6, 2004

(87) PCT Pub. No.: WO2004/008753

PCT Pub. Date: Jan. 22, 2004

(65) Prior Publication Data

US 2005/0225781 A1    Oct. 13, 2005

(30) Foreign Application Priority Data

Jul. 11, 2002  (JP)  ............. 2002-202632

(51) Int. Cl.
G06T 5/00 (2006.01)
(52) U.S. Cl. ............... 358/3.27; 382/263; 382/254
(58) Field of Classification Search ........... 358/3.27, 358/1.9, 447, 448; 348/207.2; 345/418; 382/263, 254
See application file for complete search history.

(56) References Cited

U.S. PATENT DOCUMENTS

| 6,011,547 A | 1/2000 | Shiota et al. |
| 2002/0140693 A1* | 10/2002 | Nakami et al. ............. 345/418 |

FOREIGN PATENT DOCUMENTS

| JP | 09-116926 | 5/1997 |
| JP | 10-191246 | 7/1998 |
| JP | 2000-244941 | 9/2000 |

(Continued)

OTHER PUBLICATIONS

Abstract of Japanese Patent Publication No. 09-116926, Pub. Date: May 2, 1997, Patent Abstracts of Japan.

(Continued)

*Primary Examiner*—King Y. Poon
*Assistant Examiner*—Nathan K Tyler
(74) *Attorney, Agent, or Firm*—Martine Penilla & Gencarella, LLP

(57) ABSTRACT

The sharpness of image data is adjusted using image data generated by an image generating device and image generating information that is associated with the image data and includes at least aperture information and operating mode information pertaining to the image data generation; the sharpness adjustment is performed based on the aperture information and the operation mode information included in the image generating information.

9 Claims, 18 Drawing Sheets

FOREIGN PATENT DOCUMENTS

| | | |
|---|---|---|
| JP | 2001-128048 | 5/2001 |
| JP | 2001-147481 | 5/2001 |
| JP | 2001-186297 | 7/2001 |
| JP | 2002-344989 | 11/2002 |
| JP | 2003-069872 | 3/2003 |
| JP | 2003-111005 | 4/2003 |

OTHER PUBLICATIONS

Abstract of Japanese Patent Publication No. 10-191246, Pub. Date: Jul. 21, 1998, Patent Abstracts of Japan.

Abstract of Japanese Patent Publication No. 2000-244941, Pub. Date: Sep. 8, 2000, Patent Abstracts of Japan.

Abstract of Japanese Patent Publication No. 2001-128048, Pub. Date: May 11, 2001, Patent Abstracts of Japan.

Abstract of Japanese Patent Publication No. 2001-147481, Pub. Date: May 29, 2001, Patent Abstracts of Japan.

Abstract of Japanese Patent Publication No. 2001-186297, Pub. Date: Jul. 6, 2001, Patent Abstracts of Japan.

Abstract of Japanese Patent Publication No. 2002-344989, Pub. Date: Nov. 29, 2002, Patent Abstracts of Japan.

Abstract of Japanese Patent Publication No. 2003-069872, Pub. Date: Mar. 7, 2003, Patent Abstracts of Japan.

Abstract of Japanese Patent Publication No. 2003-111005, Pub. Date: Apr. 11, 2003, Patent Abstracts of Japan.

* cited by examiner

| TAG NAME | PARAMETER VALUE |
|---|---|
| EXPOSURE TIME | 1/137 SECONDS |
| APERTURE VALUE | F8 |
| OUTPUT PROGRAM | 3 |
| LENS FOCAL LENGTH | 20. 70(mm) |
| PHOTO SCENE TYPE | STANDARD MODE |

●
●
●
●
●

OUTPUT IMAGE ADJUSTMENT OF IMAGE DATA

TECHNICAL FIELD

The present invention relates to an image adjustment technology for adjusting image quality of image data.

BACKGROUND ART

The image quality of images generated by a digital still camera (DSC), digital video camera (DVC) or the like can be freely adjusted using an image retouching application on a personal computer. Such an image retouching application generally includes an image adjustment function by which the image quality of the image data is automatically adjusted, and if this image adjustment function is used, the image quality of the image data output from an output apparatus can be improved. Known examples of an image file output apparatus include a CRT, an LCD, a printer, a projector, and a television receiver.

A function to automatically adjust the image quality of image data is also included in a printer driver that controls the operation of a printer functioning as one type of output apparatus, and the image quality of printed image data can be improved using such a printer driver as well.

However, the automatic image quality adjustment function provided by the image retouching application or printer driver performs image correction using image data having standard image characteristics. By contrast, because image data that is to undergo image processing can be generated under various different conditions, in some cases the image quality cannot be improved by executing a same given automatic image quality adjusting function.

For example, where an image such as a landscape or a commemorative photograph is to be output, it is desired that a sharp image in which all components, from the foreground to the background, are in focus. Accordingly, image data is often generated with a small aperture setting (i.e., with the aperture value set to a large value), and with the operation mode, such as the exposure adjustment mode, set to either a manual mode or an aperture priority mode in which a user-specified aperture value is given priority. However, where image quality correction based on a standard image data having general image quality characteristics is performed to this type of image data, sufficient sharpness is sometimes unobtainable. Furthermore, this problem is not limited to DSC's, and can occur in a DVC or other type of image data generating device.

The present invention is made in order to resolve the problem identified above, and an object of the present invention is to automatically carry out proper image quality adjustment for each individual image data.

DISCLOSURE OF THE INVENTION

In order to at least partially resolve the problem identified above, the image processing apparatus according to this invention is an image processing device for performing image processing using image data generated by an image generating device and image generating information that is associated with the image data and that includes at least aperture information and operating mode information at the time of generation of the image data. The device comprises an image quality adjuster configured to adjust sharpness of the image data based on the aperture information and the operation mode information included in the image generating information.

The image processing device according to this invention can carry out appropriate sharpness adjustment to the image data based on the aperture information and operation mode information pertaining to the image data generation.

In this image processing apparatus, it is preferred that the image quality adjuster determines based on the operation mode information whether or not to carry out image quality adjustment to adjust the sharpness of the image data, and determines based on the aperture information a degree of sharpness adjustment to be performed when it is determined that the image quality adjustment is to be carried out.

In this way, the determination of whether or not to perform image quality adjustment to adjust sharpness can be made properly based on the operation mode information. Furthermore, the degree of sharpness adjustment can be properly determined based on the aperture information.

In the image processing apparatus described above, it is preferred that the image quality adjuster can determine based on the operation mode information whether or not an operation mode for the image generating unit at the time of the image data generation is portrait mode, and if the operation mode is determined to be portrait mode, the image quality adjuster either (a) does not carry out the image quality adjustment, or (b) carries out weak sharpness adjustment where a degree of sharpness adjustment is lower than a value which would be taken if the aperture value were set under standard photo-taking conditions of the image generating unit.

In this way, soft images can be output based on image data generated in portrait mode by the image generating unit.

In the image processing apparatus described above, it is preferred that the image quality adjuster can obtain the aperture value used at the time of the image data generation from the aperture information, and determine whether or not the aperture value was set manually by the user, and wherein when it is determined that the aperture value was set manually and when the aperture value was set to a value in a prescribed partial range of an entire possible aperture value range, strong sharpness adjustment is performed such that a degree of sharpness adjustment is higher than a value which would be taken if the aperture value were set under the standard photo-taking conditions of the image generating unit.

In this way, the sharpness of image data generated using a selected aperture value can be adjusted more appropriately. The aperture value is ordinarily the F-number, such that the aperture decreases in size as the aperture value increases.

In the image processing apparatus described above, it is preferred that the strong sharpness adjustment is carried out when the aperture value equals or exceeds a prescribed value.

In this way, the image quality of the image data generated when the aperture value is set to equal or exceed a prescribed value can be adjusted to a higher level of sharpness.

In the image processing apparatus described above, it is preferred that the degree of sharpness adjustment performed during the strong sharpness adjustment increases as the aperture value increases.

In this way, the image quality of the image data generated when the aperture value is set to a large value can be adjusted to a higher level of sharpness.

In the image processing apparatus described above, it is preferred that the image generating information further includes information pertaining to a maximum possible aperture value of the image data generating unit that generated the image data, and the strong sharpness adjustment is performed when the aperture value is at the maximum possible aperture value.

In this way, the image quality of the image data generated when the aperture value is set to the maximum possible value can be adjusted to a higher level of sharpness.

An output apparatus according to this invention is an output apparatus for outputting an image using image data generated by an image generating device and image generating information that is associated with the image data and includes at least aperture information and operation mode information at the time of generation of the image data. The output apparatus comprises: an image quality adjuster configured to adjust sharpness of the image data based on the aperture information and operation mode information included in the image generating information, and an image output unit configured to output an image in accordance with the image quality-adjusted image data.

This invention can be implemented in various forms. Such forms may include that of an image output method, an image output apparatus, an image processing method, an image processing apparatus, a computer program that realizes the functions of either such method or apparatus, a recording medium on which such computer program is stored, data signals that include such computer program and are encoded in a carrier wave, or the like.

BRIEF DESCRIPTION OF THE DRAWINGS

FIG. 5 is an explanatory drawing showing an example of the data structure of an Exif data area;

BEST MODE FOR CARRYING OUT THE INVENTION

Modes for carrying out the present invention will now be explained according to the following sequence based on embodiments thereof.

Figure 1:
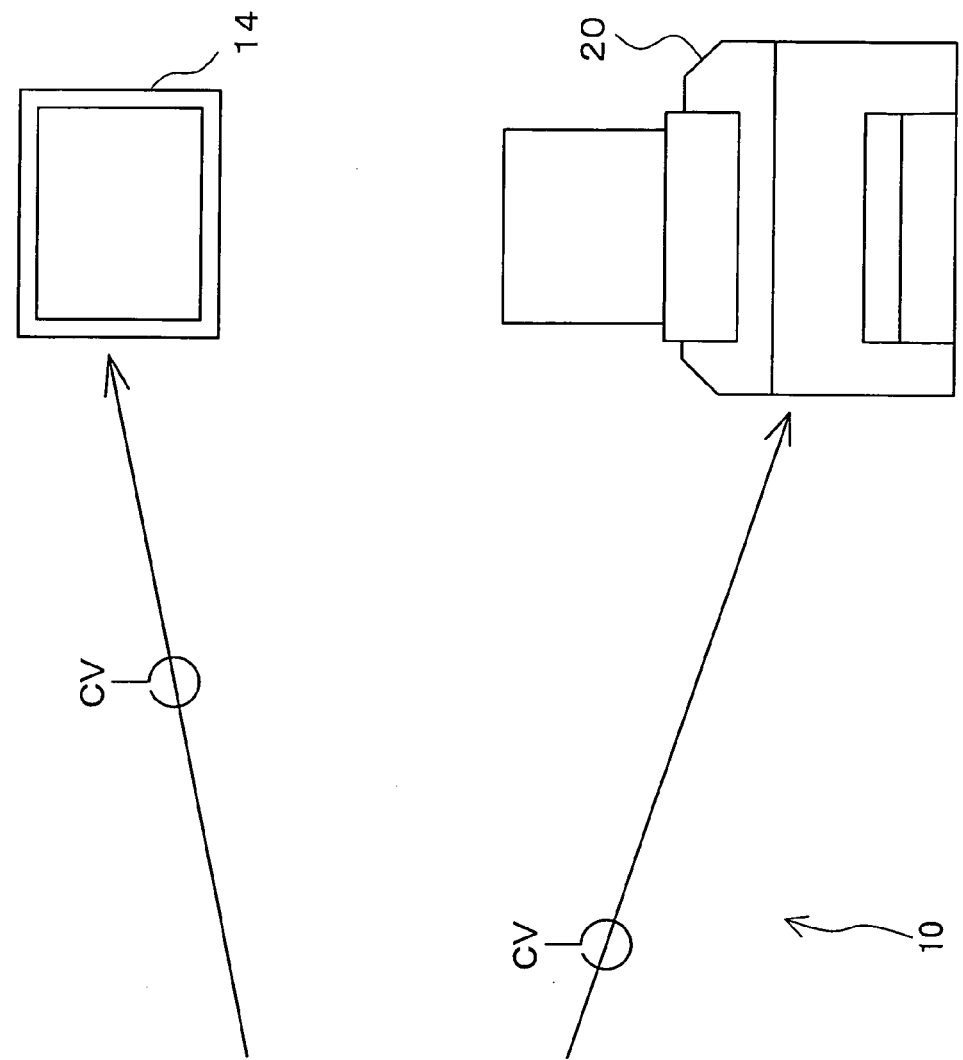
FIG. 1 is a block diagram showing the construction of an image data output system embodying the present invention.

A. Construction of image data output system
B. Structure of image file
C. Construction of image data output apparatus
D. Image processing in digital still camera
E. Image processing in printer
F. Embodiments of sharpness adjustment routine
G. Embodiments of automatic image quality adjustment process
H. Construction of image data output system using image data processing apparatus
I. Variations A. Construction of Image Data Output System:

FIG. 1 is an explanatory drawing showing an image data output system including an output apparatus embodying the present invention. The image data output apparatus 10 includes a digital still camera 12 that serves as an image data generating device that generates an image file, and a printer 20 that serves as an image output apparatus. The image file generated by the digital still camera 12 is sent to the printer 20 over a cable CV or by inserting directly into the printer 20 the memory card MC on which the image file is stored. The printer 20 performs image quality adjustment with regard to the image data based on the read-in image file, and the resulting image is output. Besides the printer 20, the output apparatus may include a monitor 14 such as a CRT display or an LDC display, a projector, or the like. The discussion below is based on a case in which a printer 20 having an image quality adjuster and an image output unit is used as an output apparatus and the memory card MC is inserted directly in the printer 20.

Figure 2:
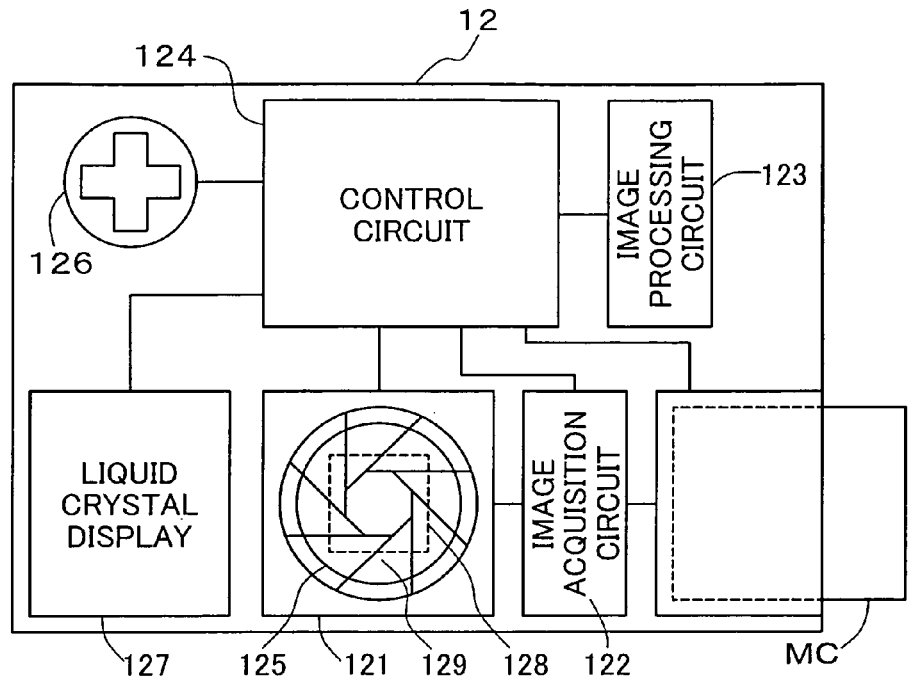
FIG. 2 is a block diagram showing the basic construction of a digital still camera 12.

FIG. 2 is a block diagram showing the basic construction of the digital still camera 12. The digital still camera 12 of this embodiment includes an optical circuit 121 that gathers optical information, an image acquisition circuit 122 that acquires an image by controlling the optical circuit, an image processing circuit 123 that performs processing to the acquired digital image, and a control circuit 124 that controls the various circuits described above. The control circuit 124 includes a memory not shown. The optical circuit 121 includes a lens 125 that gathers light information, an aperture 129 that regulates the amount of light, and a CCD 128 that converts the information pertaining to the light passing through the lens into image data.

The digital still camera 12 saves the acquired image on the memory card MC. The image data stored by the digital still camera 12 is generally saved in the JPEG format, but a different format may be used, such as the TIFF format, the GIF format, the BMP format or the raw data format.

The digital still camera 12 includes a selection/determination button used to set the various photo-taking conditions (aperture value, shutter speed, exposure adjustment mode, photo-taking mode, etc.), and a liquid crystal display 127. The liquid crystal display 127 is used when previewing the photo image or setting the aperture value or other parameters using the selection/determination button 126. The aperture value can be set to a value falling within a predetermined prescribed range in accordance with the model of the digital still camera 12, such as a prescribed discrete value between 2 and 16 (2, 2.8, 4, 5.6, etc.). Normally the F-number is used as the aperture value. Therefore, the aperture decreases in size as the aperture value increases. The shutter speed can also be set to a value falling within a prescribed range, such as to a value between 1/15 seconds and 1/250 seconds. The exposure adjustment mode can be set to one of several modes installed beforehand, such as program auto (automatic adjustment mode), aperture priority mode, shutter speed priority mode or manual mode. If program auto mode is set, the exposure is set to a standard value by adjusting the aperture value and the shutter speed automatically to standard values. If manual mode is set, user-specified values for the aperture value and shutter speed are used. A construction may be adopted in which where the aperture value and shutter speed are set by the user, the exposure adjustment mode using those set values is automatically selected. As the photo-taking mode, one of several modes installed beforehand, such as standard mode, human subject mode (portrait mode), scenery mode or night shot mode may be selected in accordance with the type of photo subject or other parameter. Where one photo-taking mode is specified by the user, the relevant parameters (such as the aperture value and the lens focal length) are set automatically in accordance with the specified photo-taking mode. For example, where standard mode is specified as the photo-taking mode, not only the aperture value but also other parameters related to image data generation are set automatically. The standard photo-taking conditions under which the aperture value is set to a standard value (for example, the photo-taking conditions set when program auto mode is selected as the exposure adjustment mode, or the photo-taking conditions set when standard mode is selected as the photo-taking mode) are the default photo-taking conditions for the digital still camera 12. The standard photo-taking conditions are often used as the default settings when the digital still camera 12 is purchased.

Where photo-taking is performed using the digital still camera 12, the image data and image generating information are stored in the memory card MC as an image file. The image generating information can include the set values for parameters such as the aperture value used for photo-taking (image data generation). The image generating information will be described below.

Figure 3:
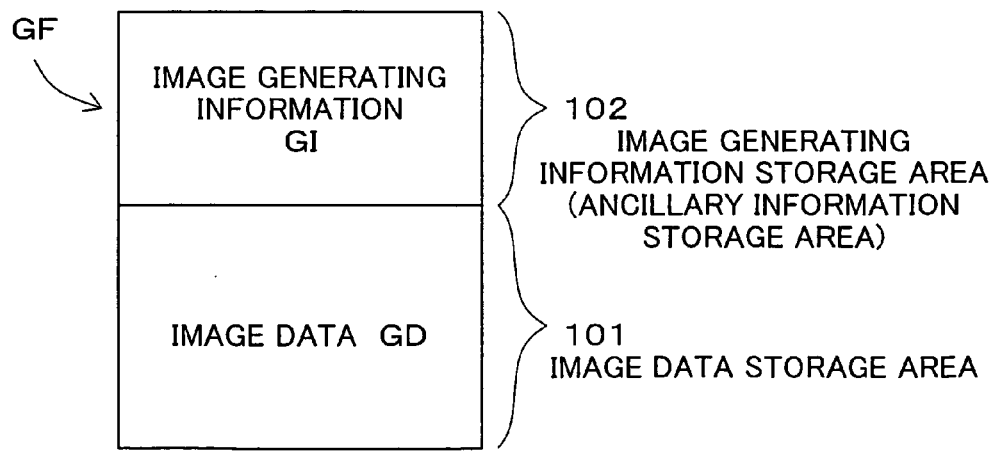
FIG. 3 is an explanatory drawing showing in a conceptual fashion an example of the internal construction of an image file that can be used in this embodiment.

B. Structure of Image File:

FIG. 3 is an explanatory drawing showing in a conceptual fashion the internal structure of an image file that can be used in this embodiment. The image file GF includes an image data storage area 101 that stores image data GD and an image generating information storage area 102 that stores image generating information GI. The image data GD is stored in JPEG format, and the image generating information GI is stored in TIFF format (a format in which data and data areas are specified using tags), for example. The terms "file structure" and "data structure" in this embodiment refer to the structure of files or data when such files or data are stored in a storage device.

The image generating information GI is related to generation of the image, or photo-taking, by an image data generating device such as the digital still camera 12, and includes the set values for the following parameters:

aperture value
shutter speed
exposure time
lens focal length
exposure adjustment mode
photo-taking mode
manufacturer
model name
gamma value The image file GF in this embodiment should basically include the image data storage area 101 and the image generating information storage area 102, and can have a file structure compatible with a standard file format. The description below will assume a case in which the image file GF pertaining to this embodiment is in the Exif file format.

An Exif file has a file structure compatible with an image file format standard for digital cameras (Exif), and its specifications are established by the Japan Electronics and Information Technology Industries Association (JEITA). Similar to the conceptual diagram in FIG. 3, the Exif file format includes a JPEG image data storage area that stores image data in the JPEG format and an ancillary information storage area that stores various information pertaining to the stored JPEG image data. The JPEG image data storage area corresponds to the image data storage area 101 shown in FIG. 3, and the ancillary information storage area corresponds to the image generating information storage area 102. Image generating information pertaining to JPEG image, such as the date of exposure, the aperture value and the shutter speed, are stored in the ancillary information storage area.

Figure 4:
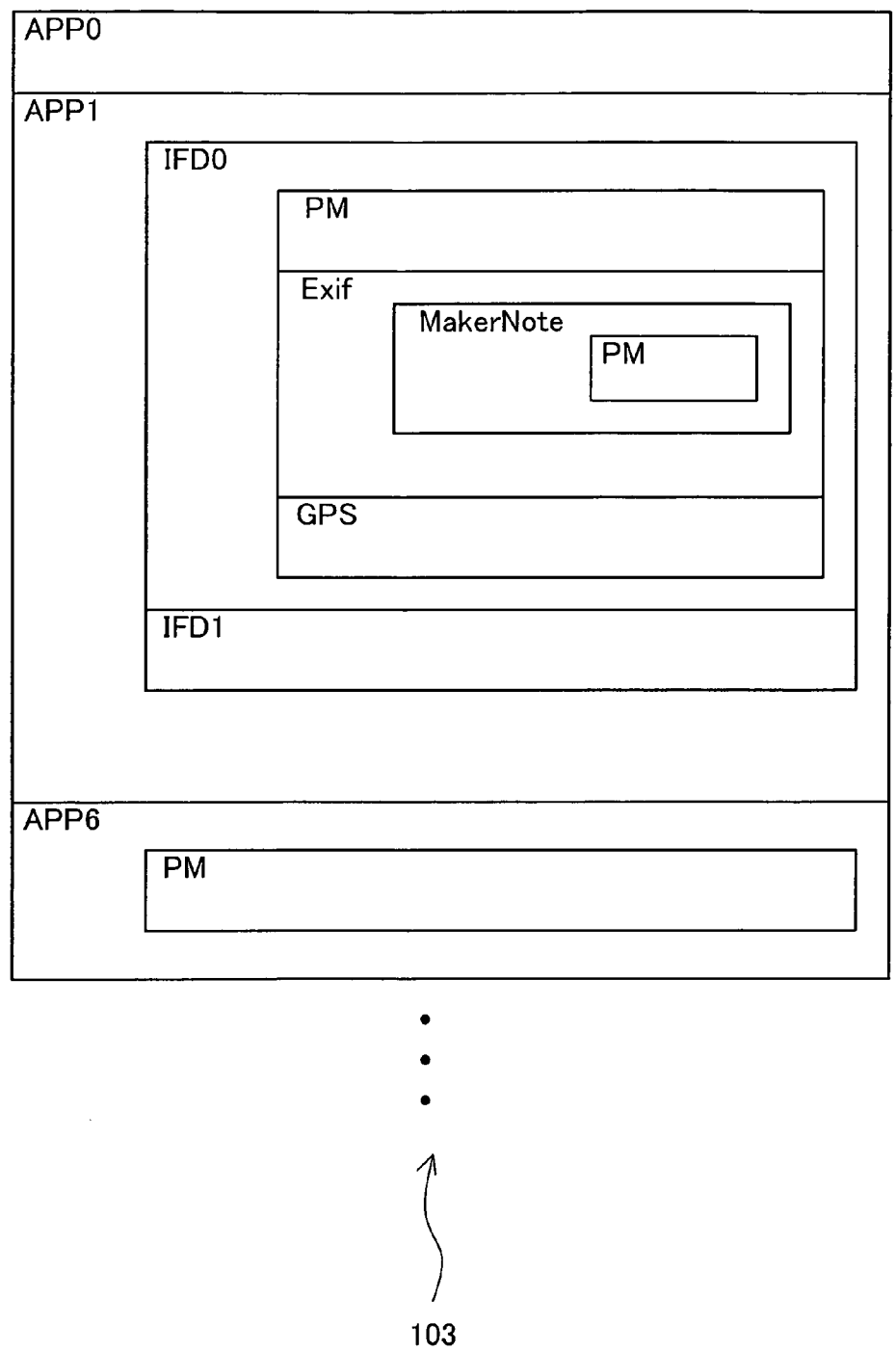
FIG. 4 is an explanatory drawing showing an example of the data structure of an ancillary information storage area 103.

FIG. 4 is an explanatory drawing showing an example of the data structure of the ancillary information storage area 103. In the Exif file format, hierarchical tags are used to identify data areas. Each data area can contain multiple subordinate data areas that are specified by subordinate tags. In FIG. 4, each area enclosed by a rectangle indicates a data area, and the tag name is shown in the upper left-hand corner of the area. This embodiment includes three data areas having the tag names APP0, APP1 and APP2. The APP1 data area contains two data areas having the tag names IFD0 and IFD1. The IFD0 data area contains three data areas having the tag names PM, Exif and GPS. Data and data areas are stored in accordance with a specified address or offset value, and these addresses and offset values can be found using tag names. On the side of the output apparatus, data corresponding to desired information can be obtained by specifying an address or offset value corresponding to the desired information.

FIG. 5 is an explanatory drawing showing an example of the data structure (the tag names and parameter values) of the Exif data area, which can be referred to by following the tag names in the order of APP1-IFD0-Exif. While not shown in FIG. 5, the Exif data area can include a data area having the tag name "MakerNote", and this MakerNote area can further include other items of data, as shown in FIG. 4.

Parameter values corresponding to information such as the exposure time, the aperture value, the exposure program, the lens focal length and the photo scene type are stored in the Exif data area, as shown in FIG. 5. The aperture value can be used as aperture information, and the exposure program and photo scene type can be used as operation mode information.

The exposure program identifies the exposure adjustment mode, and is selected and set from among multiple values that include the following four values, for example.

Parameter value 1: Manual mode
Parameter value 2: Program auto mode
Parameter value 3: Aperture priority mode
Parameter value 4: Shutter speed priority mode The photo scene type identifies the photo-taking mode, and is selected and set from among standard mode, human subject mode (portrait mode), scenery mode and night shot mode, for example.

Information associated with the image data is also stored in areas other than the Exif data area in FIG. 4 if necessary. For example, the manufacturer name and model name, which serve as information that specify the image data generating device, are stored in the data area having the tag name of IFD0.

Figure 6:
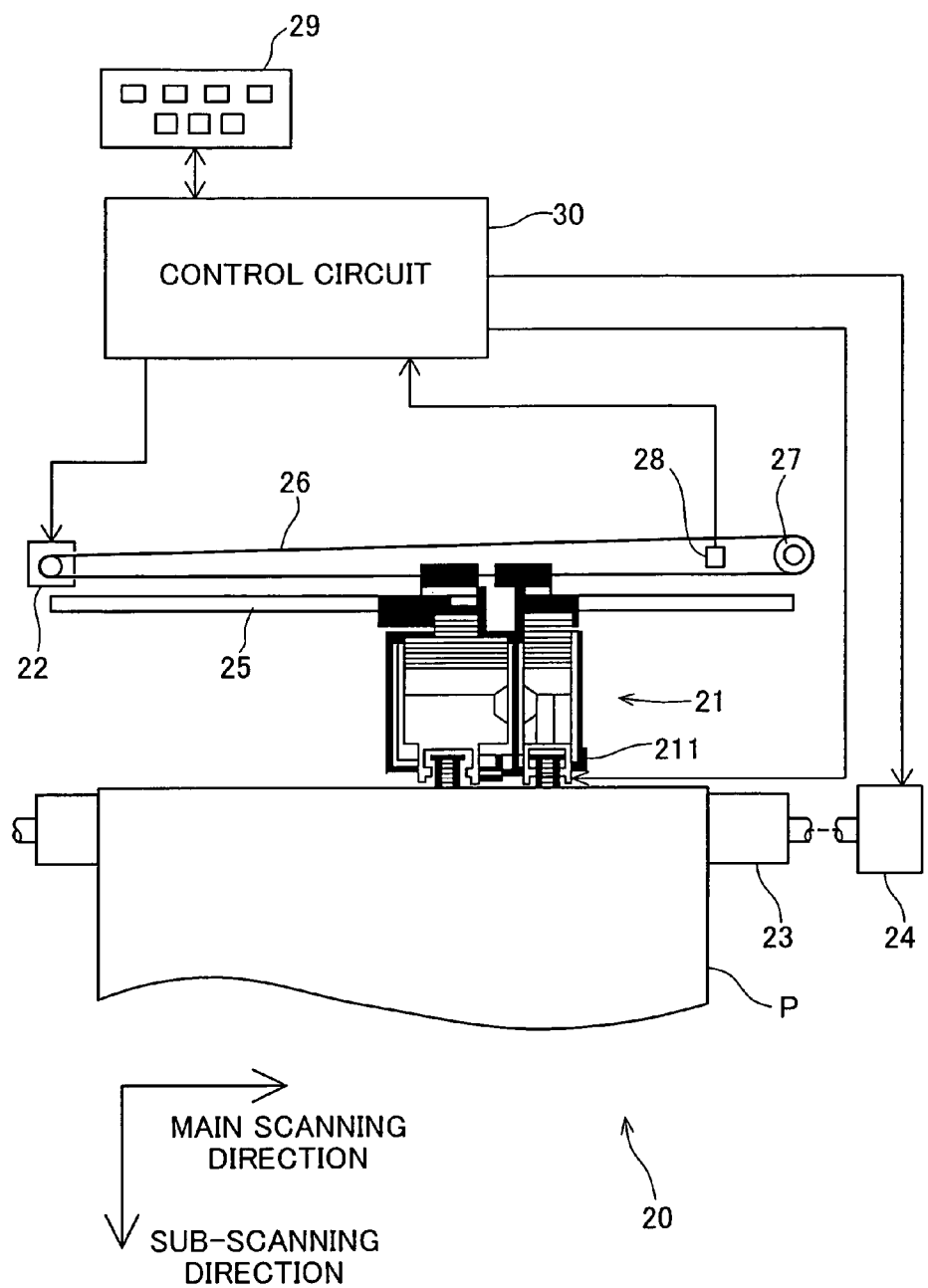
FIG. 6 is a block diagram showing the basic construction of a printer 20.

C. Construction of Image Data Output Apparatus:

FIG. 6 is a block diagram showing the basic construction of the printer 20 of this embodiment. The printer 20 can output images, and is, for example, an inkjet printer that forms dot patterns by discharging ink in the four colors of cyan (C), magenta (Mg), yellow (Y) and black (K) onto a printing medium. Alternatively, an electrophotographic printer that forms images by transferring and fusing toner onto a printing medium can also be used. In addition to the four ink colors described above, the colors of light cyan (LC) having a lower colorant concentration than cyan (C), light magenta (LM) having a lower colorant concentration than magenta (Mg) and dark yellow (DY) having a higher colorant concentration than yellow (Y) can be used. Only black ink (K) may be used when monochrome printing is performed, or red (R) and green (G) may be used. The type of ink or toner used may be determined in accordance with the characteristics of the images to be output.

As shown in the drawing, the printer 20 includes a mechanism that drives a print head 211 that is mounted on a carriage 21 and discharges ink to form dots, a mechanism that uses a carriage motor 22 to drive the carriage 21 forward and backward along the axial direction of a platen 23, a mechanism that feeds printing paper P via a paper feed motor 24, and a control circuit 30. These mechanisms enable the printer 20 to function as an image output unit. The mechanism to move the carriage 21 forward and backward along the axial direction of the platen 23 includes such components as a moving axis 25 that movably supports the carriage 21 and is mounted parallel to the platen 23, a pulley 27 over which is suspended a continuous-loop driving belt 26 disposed between the pulley 27 and a carriage motor 22, and a position sensor 28 that detects the original position of the carriage 21. The mechanism to feed the printing paper P includes such components as the platen 23, a paper feed motor 24 that causes the platen 23 to rotate, a paper feed auxiliary motor not shown, and a gear train (omitted from the drawing) that transmits the rotation of the paper feed motor 24 to the platen 23 and the paper feed auxiliary motor.

The control circuit 30 appropriately controls the movement of the paper feed motor 24 and the carriage motor 22, as well as the print head 211, while sending and receiving signals to and from the printer operation panel 29. The printing paper P supplied to the printer 20 is set such that it is grasped between the platen 23 and the paper feed auxiliary roller, and is fed a prescribed amount in accordance with the rotation of the platen 23.

The carriage 21 has a print head 211, and can house an ink cartridge containing usable inks. Nozzles (not shown) that discharge the usable inks are disposed on the bottom surface of the print head 211.

Figure 7:
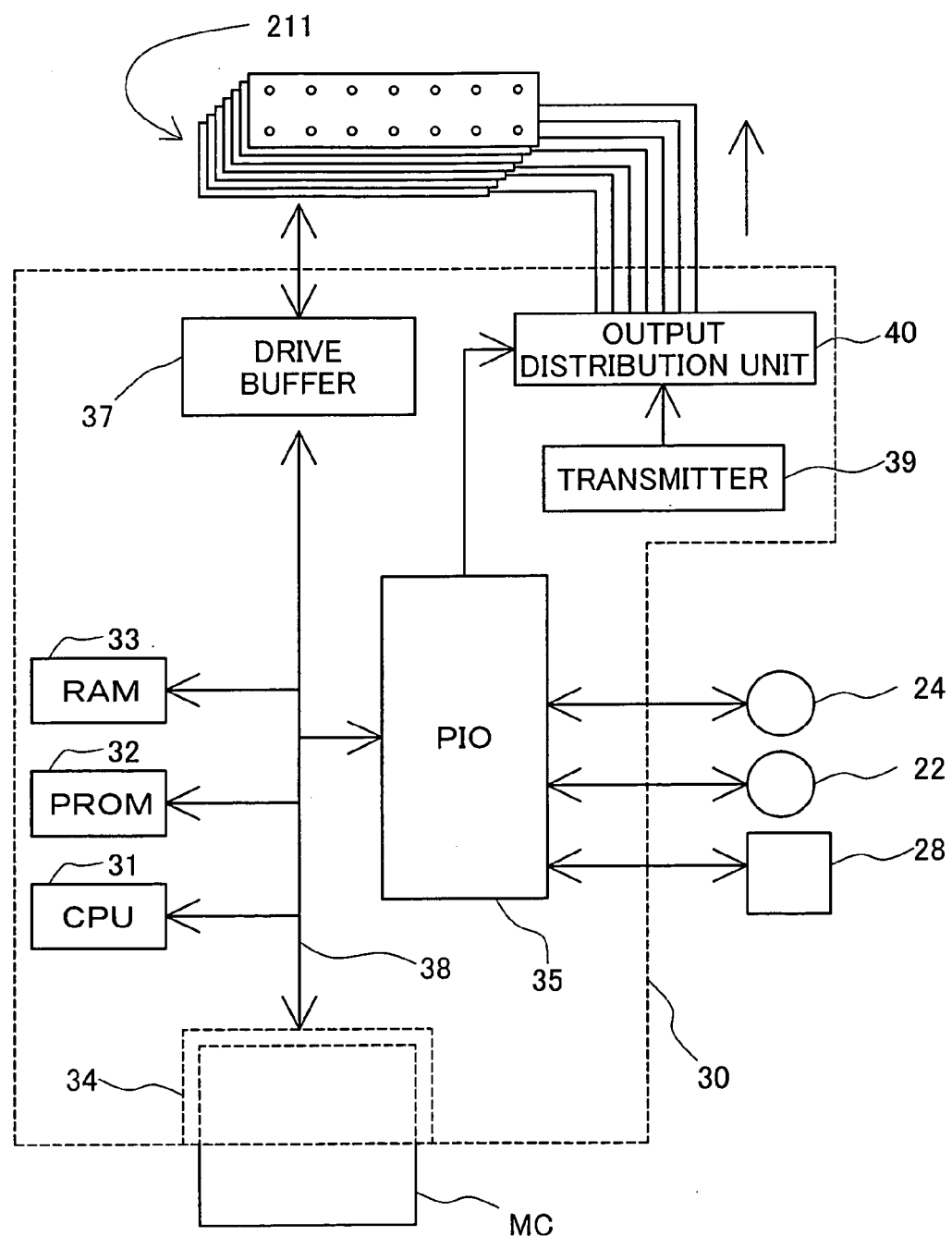
FIG. 7 is a block diagram showing the construction of the printer 20 focusing on the control circuit 30 thereof.

FIG. 7 is a block diagram showing the construction of the printer 20 with a focus on the control circuit 30 thereof. Disposed in the control circuit 30 are a CPU 31, a PROM 32, a RAM 33, a memory card slot 34 that receives data from the memory card MC, a peripheral device I/O unit (PIO) 35 that exchanges data with the paper feed motor 24 and the carriage motor 22, for example, a drive buffer 37 and the like. The drive buffer 37 is used as a buffer to supply dot ON/OFF signals to the print head 211. These various internal circuit components are connected via a bus 38, enabling data to be exchanged therebetween. Also disposed in the control circuit 30 are a transmitter 39 that outputs a drive waveform having a prescribed frequency and an output distribution unit 40 that distributes the output from the transmitter 39 to the print head 211 in accordance with a prescribed timing sequence.

The control circuit 30 outputs dot data to the drive buffer 37 according to a prescribed timing sequence in synchronization with the movement of the paper feed motor 24 and the carriage motor 22. It also reads an image file from the memory card MC, analyzes the ancillary information, and performs image processing based on the image generating information. In other words, the control circuit 30 functions as an image quality adjuster. The sequence of operations performed by the control circuit 30 will be explained in detail below.

Figure 8:
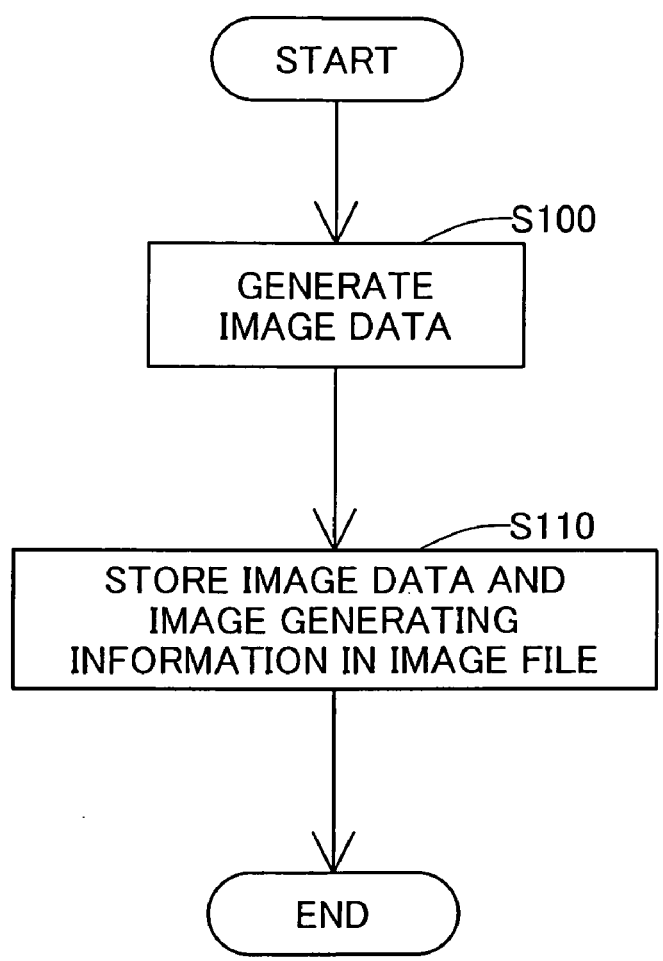
FIG. 8 is a flow chart showing the sequence of operations for a generating process performed by the digital still camera 12 to an image file GF.

D. Image Processing in Digital Still Camera:

FIG. 8 is a flow chart showing the sequence of operations performed in the digital still camera 12 to generate an image file GF.

The control circuit 124 of the digital still camera 12 (see FIG. 2) generates image data GD in response to a photo-taking request, such as the pressing of the shutter button (step S100). Where parameter values such as the aperture value, exposure adjustment mode and photo-taking mode are set, the image data is generated using these parameter values.

The control circuit 124 stores the generated image data GD and image generating information GI on the memory card MC as an image file GF (step S110) and terminates the processing routine. The image generating information GI includes: parameter values used during image generation, such as the shutter speed; parameter values that can be freely set, such as the photo-taking mode and the exposure adjustment mode; and parameter values that are set automatically, such as the manufacturer and model name of the digital still camera 12. The image data GD undergoes JPEG compression after being converted from the RGB color space to the YCbCr color space, whereupon it is saved as an image file GF.

By carrying out the above processing in the digital still camera 12, the image data GD and the image generating information GI that includes the various parameter values used during image data generation are set in the image file GF.

Figure 9:
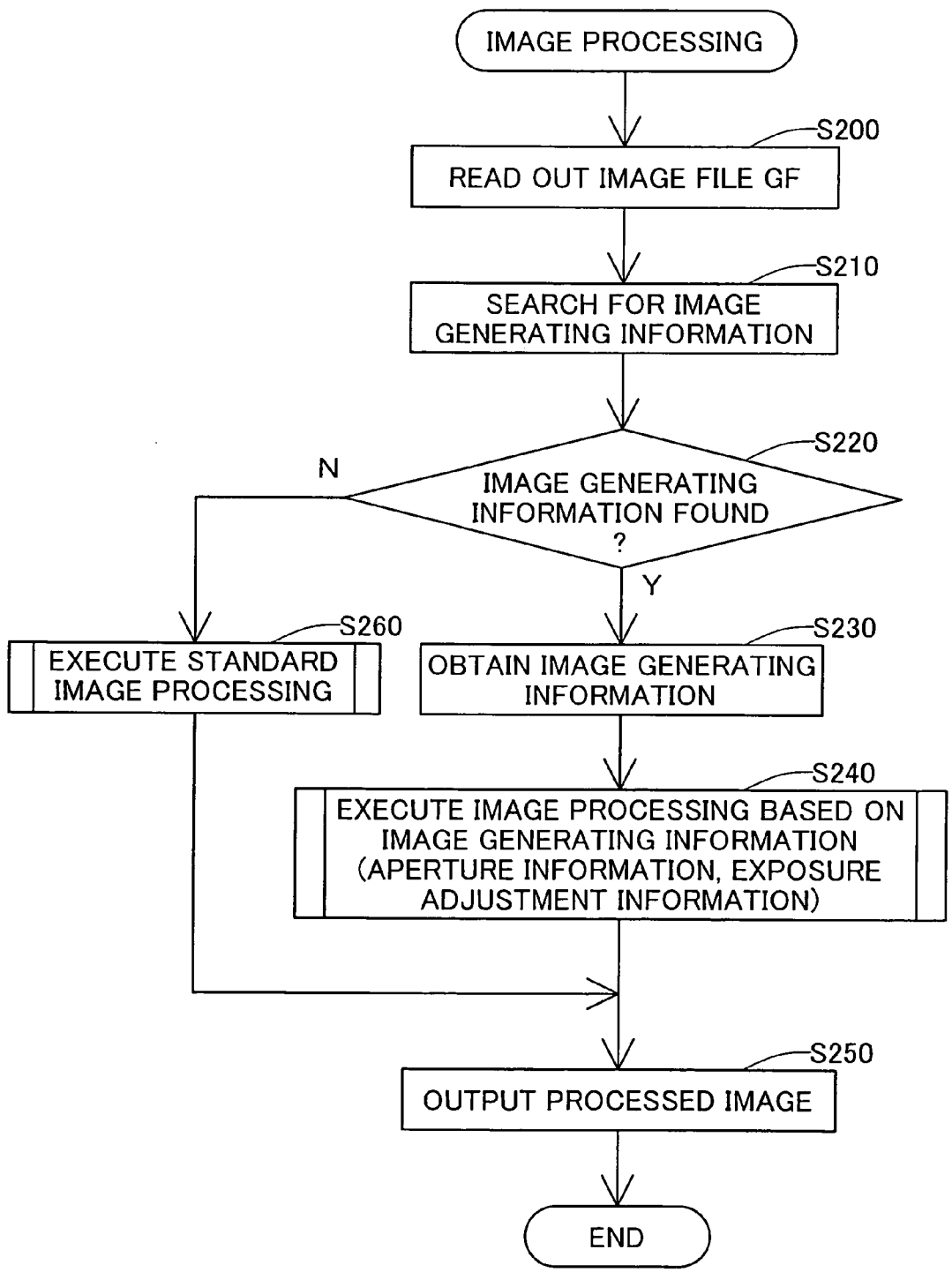
FIG. 9 is a flow chart showing an image processing routine carried out by the printer 20.

E. Image Processing in Printer:

FIG. 9 is a flow chart showing the image processing routine carried out in the printer 20 of this embodiment. The description below assumes a case in which the memory card MC on which the image file GF is stored in inserted directly in the printer 20. When the memory card MC is inserted in the memory card slot 34, the CPU 31 of the control circuit 30 (see FIG. 7) reads the image file GF (see FIG. 3) from the memory card MC (step S200). In step S210, the CPU 31 searches the ancillary information storage area of the image file GF for the image generating information GI indicating the information used during image data generation. Where the image generating information GI is found (YES in step 220), the CPU 31 obtains and analyzes it (step 230). The CPU 31 then carries out the image processing described below based on the analyzed image generating information GI (step S240) and outputs the processed image (step S250), whereupon the routine ends.

On the other hand, an image file generated using a drawing application or the like does not have image generating information GI containing such information as the aperture value. Where image generating information GI is not found (NO in step S220), the CPU 31 carries out standard processing (step S260) and outputs the processed image (step S250), whereupon the processing routine ends.

Figure 10:
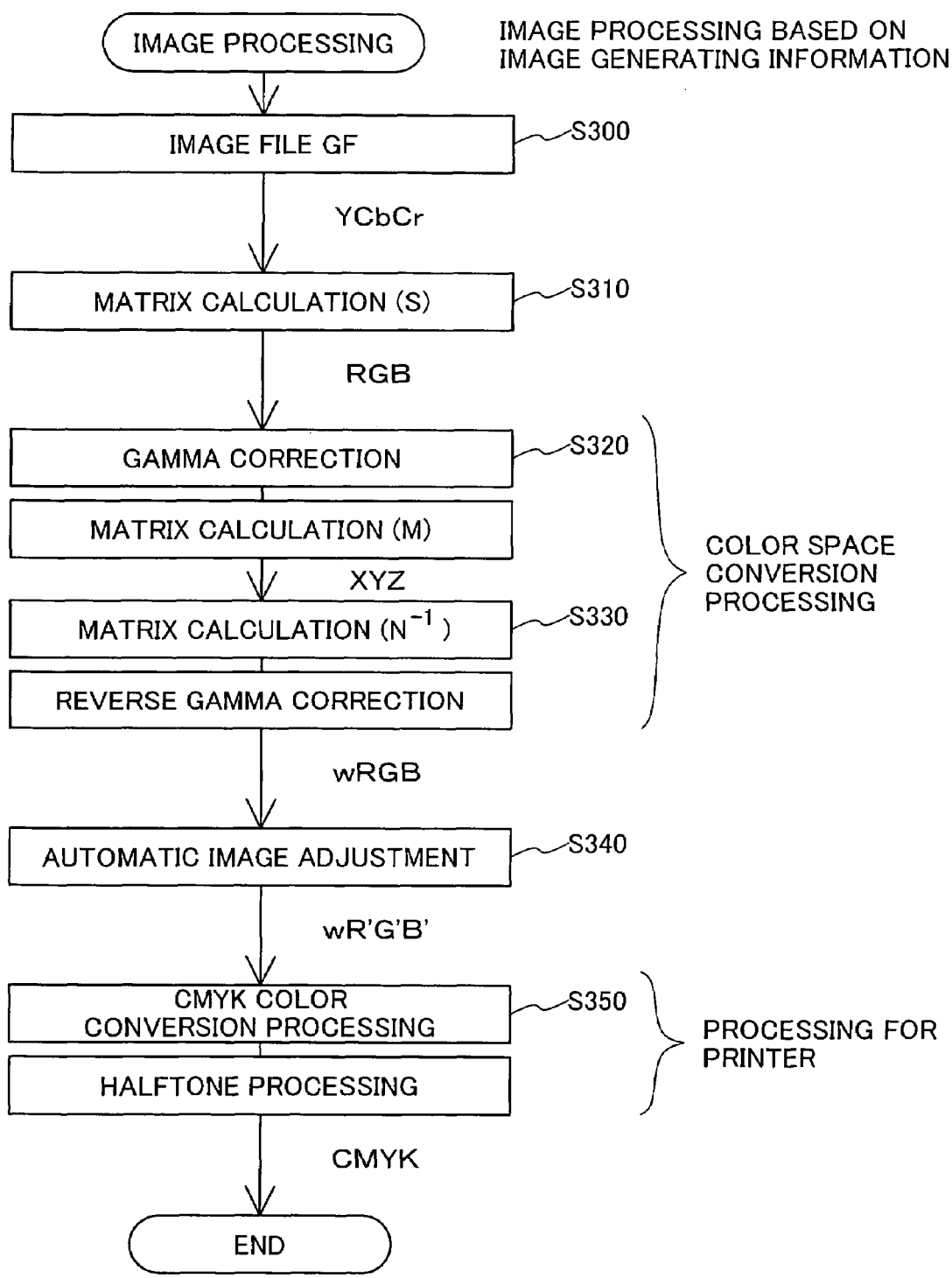
FIG. 10 is a flow chart showing an image processing routine based on image generating information.

FIG. 10 is a flow chart showing the image processing routine performed in step S240 of FIG. 9 based on the image generating information. The CPU 31 of the control circuit 30 of the printer 20 (see FIG. 7) extracts the image data GD from the read-out image file GF (step S300).

The digital still camera 12 saves the image data GD as a JPEG format file as described above, in which the image data is saved using the YCbCr color space. In step S310, the CPU 31 performs calculation using a 3×3 matrix S in order to convert the image data based on the YCbCr color space to image data based on the RGB color space. This matrix calculation uses the equation below, for example.

$$\begin{pmatrix} R \\ G \\ B \end{pmatrix} = S \begin{pmatrix} Y \\ Cb - 128 \\ Cr - 128 \end{pmatrix} \quad \text{[Equation 1]}$$

$$S = \begin{pmatrix} 1 & 0 & 1.40200 \\ 1 & -0.34414 & -0.71414 \\ 1 & 1.77200 & 0 \end{pmatrix}$$

Where the color space of the image data generated by the digital still camera 12 is larger than a prescribed color space, such as the sRGB color space, for example, the RGB color space-based image data obtained in step S310 may include value data outside the defined region of that RGB color space. If the image generating information GI contains an instruction to treat the data outside the defined region as valid data, the data outside the defined region is saved as is, and image processing is continued. If there is no instruction to treat the data outside the defined region as valid data, such data is clipped to fall within the defined region. For example, where the defined region is 0-255, values under 0 are rounded to 0, and values of 256 or larger are rounded down to 255. Where the color space that can be expressed by the image output unit is not larger than a prescribed color space, such as the sRGB color space, for example, it is preferred that the data be clipped to fall within the defined color space regardless of the presence or absence of an instruction in the image generating information GI. Such a case may include a situation in which, for example, the image data is output to a CRT that uses the sRGB color space as the expressible color space.

Next, in step S320, the CPU 31 performs gamma correction as well as calculation using a matrix M, and converts the image data based on the RGB color space to image data based on the XYZ color space. The image file GF can include the gamma value and color space information present during image generation. If the image generating information GI contains these items of information, the CPU 31 obtains the gamma value for the image data from the image generating information GI and subjects the image data to gamma conversion processing using the obtained gamma value. Furthermore, the CPU 31 obtains the color space information for the image data from the image generating information GI and performs matrix calculation regarding the image data using the matrix M for that color space. If the image generating information GI does not include a gamma value, gamma conversion processing can be carried out using a standard gamma value. If the image generating information GI does not include color space information, matrix calculation can be performed using a standard matrix M. For this standard gamma value and matrix M, the gamma value and matrix corresponding to the sRGB color space may be used, for example.

This matrix calculation is performed using the equation shown below, for example.

$$\begin{pmatrix} X \\ Y \\ Z \end{pmatrix} = M \begin{pmatrix} Rt' \\ Gt' \\ Bt' \end{pmatrix} \quad \text{[Equation 2]}$$

$$M = \begin{pmatrix} 0.6067 & 0.1736 & 0.2001 \\ 0.2988 & 0.5868 & 0.1144 \\ 0 & 0.0661 & 1.1150 \end{pmatrix}$$

$$Rt, Gt, Bt \geq 0$$

$$Rt' = \left(\frac{Rt}{255}\right)^{\gamma} \quad Gt' = \left(\frac{Gt}{255}\right)^{\gamma} \quad Bt' = \left(\frac{Bt}{255}\right)^{\gamma}$$

$$Rt, Gt, Bt < 0$$

$$Rt' = -\left(\frac{-Rt}{255}\right)^{\gamma} \quad Gt' = -\left(\frac{-Gt}{255}\right)^{\gamma} \quad Bt' = -\left(\frac{-Bt}{255}\right)^{\gamma}$$

The color space for the image data obtained after matrix calculation is the XYZ color space. The XYZ color space is an absolute color space, and is a device-independent color space that does not depend on any particular device, such as a digital still camera or a printer. Consequently, by performing color space conversion using the XYZ color space, device-independent color matching can be achieved.

Next, in step S330, the CPU 31 performs calculation using a matrix $N^{-1}$, as well as reverse gamma correction, and converts the image data based on the XYZ color space to image data based on the wRGB color space. To carry out gamma correction, the CPU 31 obtains the printer's gamma value from the PROM 32, and performs reverse gamma conversion processing of the image data using the reciprocal of the obtained gamma value. In addition, the CPU 31 obtains from the PROM 32 the matrix $N^{-1}$ corresponding to the conversion from the XYZ color space to the wRGB color space and performs matrix calculation regarding the image data using this matrix $N^{-1}$. This matrix calculation uses the equation shown below, for example.

$$\begin{pmatrix} Rw \\ Gw \\ Bw \end{pmatrix} = N^{-1} \begin{pmatrix} X \\ Y \\ Z \end{pmatrix}$$ [Equation 3]

$$N^{-1} = \begin{pmatrix} 3.30572 & -1.77561 & 0.73649 \\ -1.04911 & 2.1694 & -1.4797 \\ 0.06568289 & -0.241078 & 1.24898 \end{pmatrix}$$

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

In step S340, the CPU 31 executes the automatic image quality adjustment process. This process in the embodiment executes automatic sharpness adjustment of the image data using the image generating information contained in the image file GF, particularly the aperture value which serves as aperture information, and the exposure program parameter value which serves as operation mode information. Sharpness adjustment and automatic image quality adjustment processing will be described later.

In step S350, the CPU 31 executes CMYK color conversion processing and halftone processing for printing. In CMYK color conversion processing, the CPU 31 converts the color space of the image data from the wRGB color space to the CMYK color space with reference to a lookup table (LUT) used for conversion from the wRGB color space to the CMYK color space and stored in the PROM 32. In other words, image data consisting of RGB tone values is converted to image data used by the printer 20 including, for example, six tone values of C (Cyan), Mg (Magenta), Y (Yellow), K (Black), LC (Light Cyan) and LM (Light Magenta).

In halftone processing, the CPU 31 executes so-called halftone processing, and generates halftone image data from the color-converted image data. This halftone image data is rearranged in the order in which it is to be forwarded to the drive buffer 37 (see FIG. 7), ultimately becoming print data, whereupon this processing routine is ended. The image data that underwent processing in this routine is then output in the image processing routine of step S250 shown in FIG. 9.

F. Embodiments of Sharpness Adjustment Process:

For sharpness adjustment, an unsharp masking process may be employed. FIGS. 11(a)-11(d) are conceptual drawings that describe a sharpness adjustment method that uses an unsharp mask. The stages of sharpness adjustment are described sequentially using the brightness of pixels arranged in a straight line.

Figure 11A:
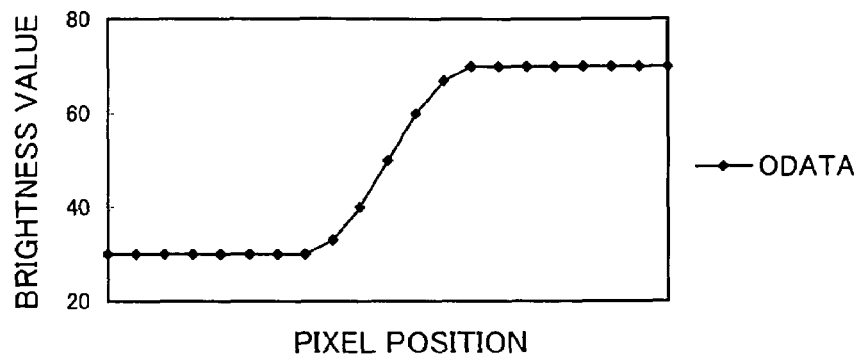
FIGS. 11(a)-11(d) are conceptual drawings showing a sharpness adjustment method that uses an unsharp mask.

FIG. 11(a) shows the original data ODATA prior to sharpness adjustment. The vertical axis indicates the brightness value for each pixel, and in this example, the brightness may have a value between 0 and 100. The horizontal axis indicates the pixel position, and each mark indicates one pixel among multiple pixels arranged in a straight line. In other words, marks indicating pixels arranged in a straight line are aligned along the horizontal direction in accordance with the order of arrangement of the pixels. Sharpness adjustment will be described using as the original data ODATA the data for an area in which the brightness values change in a stair-step fashion in this way.

In order to increase sharpness, a method using an unsharp mask can be employed. In this method, data having dull changes in brightness (i.e., unsharp data) is prepared and the changes in brightness are enhanced by subtracting the unsharp data from the original data. Unsharp data can be obtained by averaging the brightness values of each pixel of the original data using the brightness values of the surrounding pixels. This averaging method, may be performed by computing an average of the brightness value of the target pixel and the average values of the surrounding pixels. Alternatively, an averaging method may be employed in which greater weight is given to the brightness values of closer pixels having a smaller pixel distance to the target pixel. A Gaussian function focusing on the target pixel may be used for this weighting function (unsharp mask) because the pixels of actual image data are distributed on a two-dimensional plane, a two-dimensional Gaussian function is used.

Figure 11B:
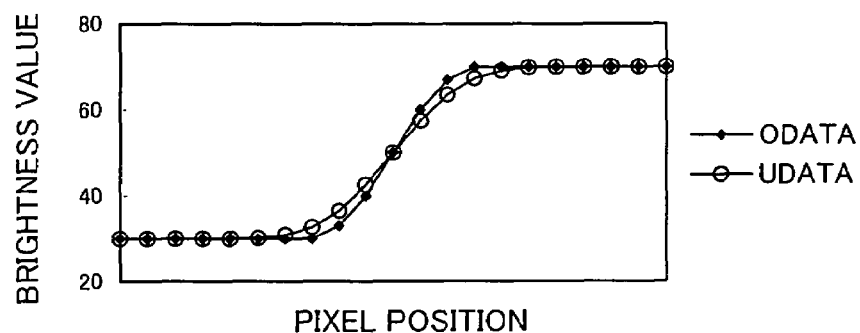

FIG. 11(b) shows the brightness values of the unsharp data UDATA generated using an unsharp mask. In comparison with the original data ODATA, the changes in the brightness values are less pronounced.

Figure 11C:
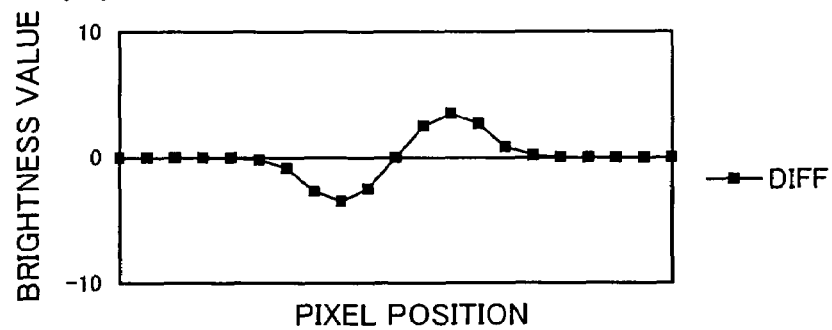
Figure 11D:
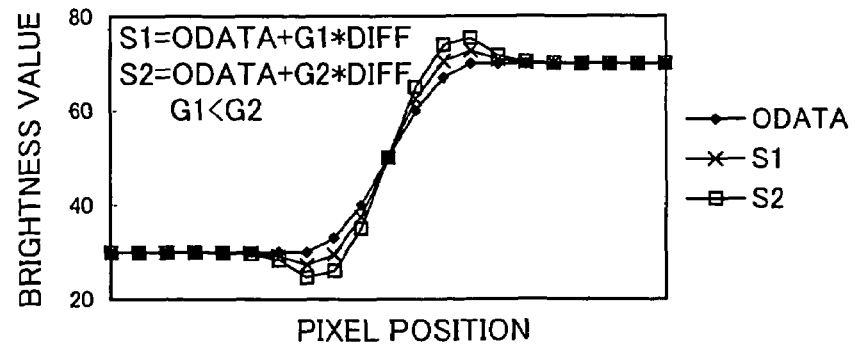

FIG. 11(c) shows difference data DIFF derived by subtracting the unsharp data UDATA from the original data ODATA. Sharp data in which the changes in brightness values are enhanced can be obtained by adding to the original data ODATA the product obtained by multiplying this difference data DIFF by a prescribed coefficient G. FIG. 11(d) shows the brightness values of sharp data obtained using various different coefficients G. S1 shows sharp data using a relatively small coefficient G1, while S2 shows sharp data using a relatively large coefficient G2. In both S1 and S2, the changes in brightness are steeper than they are in the original data, making image sharpness clearer. Furthermore, as can be seen from a comparison between S1 and S2, the intensity of sharpness adjustment can be increased as the coefficient G increases. If the coefficient G is set to "0", the original data ODATA matches the sharp data, and sharpness adjustment is not performed.

Sharpness reduction may be attained by using the unsharp data UDATA described above as the data after the sharpness adjustment. In this case, the changes in brightness of the obtainable unsharp data decline in magnitude as the size of the unsharp mask increases.

By adjustment the amount of the coefficient G or the size of the unsharp mask as described above, the degree of sharpness adjustment can be changed.

Figure 12:
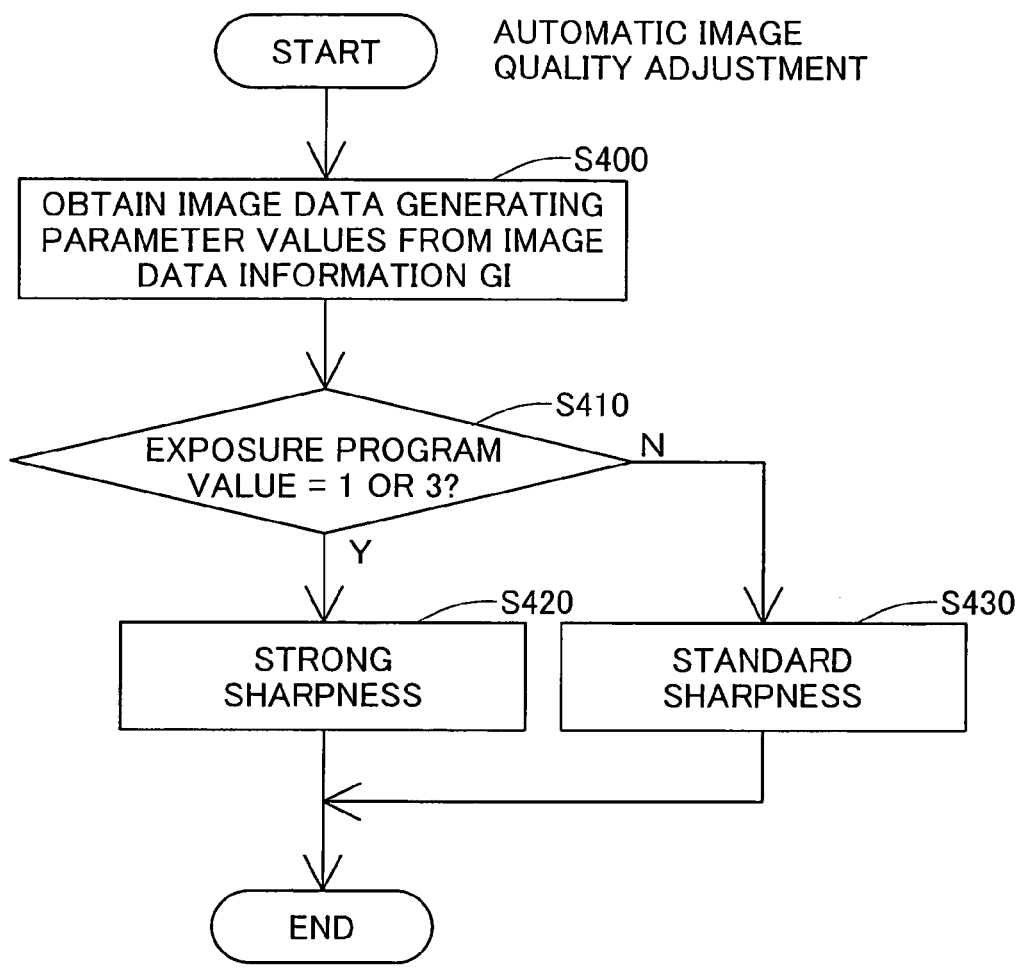
FIG. 12 is a flow chart showing an automatic image quality adjustment processing routine.

G. Embodiments of Automatic Image Quality Adjustment Process:

G1. First Embodiment of Automatic Image Quality Adjustment Process:

FIG. 12 is a flow chart showing an automatic image quality adjustment routine of this embodiment in step S340 of FIG. 10. The CPU 31 analyzes the image generating information GI and obtains the aperture value and exposure program value (step S400). In step S410, it is determined whether or not the aperture value used for image data generation was manually set. In this example, for manual setting, the user can choose either of manual exposure adjustment mode and aperture priority exposure adjustment mode. In manual mode, the exposure program value (see FIG. 5) is "1", while in aperture priority mode, it is "3". The CPU 31 determines whether or not the exposure program value is "1" or "3".

If it is determined that the exposure adjustment mode is neither manual mode nor aperture priority mode (No in step S410), the CPU 31 performs image adjustment using a standard degree of sharpness adjustment in step S430. If the exposure adjustment mode is either manual mode or aperture priority mode (Yes in step S410), because the aperture value is set manually, it is determined that the user intends to set the depth of field of the image to a preferred level. In this case, if the aperture is small (i.e., the aperture value is large), the CPU 31 performs in step S420 image quality adjustment wherein the degree of sharpness adjustment is high.

Figure 13:
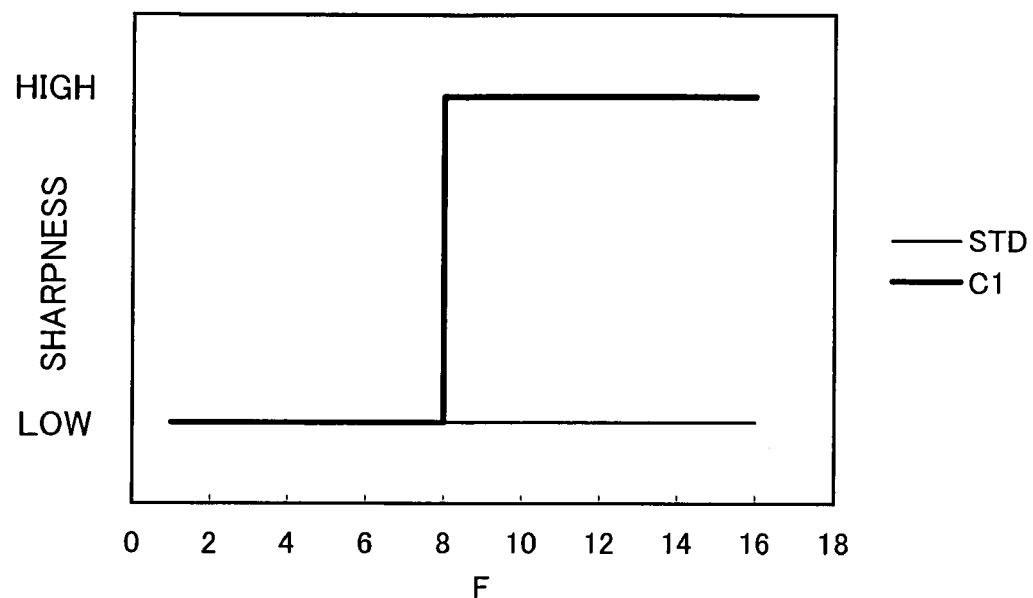
FIG. 13 is an explanatory drawing showing the relationship between the degree of sharpness adjustment and the aperture value in a first embodiment of the automatic image quality adjustment process.

FIG. 13 is an explanatory drawing showing the relationship between the degree of sharpness adjustment and the aperture value. The vertical axis in each chart indicates the degree of sharpness adjustment (termed the "sharpness intensity" below), wherein the adjusted sharpness increases in intensity as the axis value increases. The horizontal axis in each chart indicates the aperture value F. STD indicates the sharpness intensity of the image quality adjustment where the aperture value is set in the digital still camera 12 under standard photo-taking conditions (termed "standard sharpness intensity" below), while C1 indicates the sharpness intensity of the image quality adjustment where the aperture value is set manually (termed "high sharpness intensity" below). In this embodiment, the standard sharpness intensity STD is used where the exposure adjustment mode is program auto or shutter speed priority mode (see step S430 in FIG. 12) and the high sharpness intensity C1 is used where the exposure adjustment mode is manual mode or aperture priority mode (see step S420 in FIG. 12). The "standard photo-taking conditions" for the digital still camera 12 refers to the default photo-taking conditions in effect when the digital still camera 12 is shipped from the factory, and are normally equivalent to the "program auto" photo-taking conditions. Another arrangement may also be adopted in which image quality adjustment is performed using a sharpness intensity different from the standard sharpness intensity when the mode is shutter speed priority mode.

The high sharpness intensity C1 is set such that it is larger than the standard sharpness intensity STD when the aperture value is "8" or higher. As a result, where the user sets the aperture value to a large value (i.e., to a small aperture) in order to obtain sharper image output, sharper image output can be effectively obtained. The prescribed aperture value at which the high sharpness intensity C1 becomes larger than the standard sharpness intensity STD is not limited to "8", and may be preset to any desired value. For example, by setting it to "4", sharper images can be output, and by setting it to "11", softer images can be output.

For the standard sharpness intensity STD, a value preset to obtain output results for images generated under standard operating conditions for the digital still camera 12 (e.g., program auto mode) can be used. Alternatively, the standard sharpness intensity STD may be adjusted for each image in accordance with the results of image sharpness analysis for each image in order to obtain an image sharpness value close to the standard value. Image sharpness can be obtained by averaging edge amounts for each pixel, where the edge amount for one pixel is defined as the absolute value of the difference in brightness between that pixel and the brightness of a prescribed surrounding pixel. Alternatively, sharpness may be defined as the value obtained from averaging pixel values where pixels having a large edge amount (i.e., pixels thought to be equivalent to the edge in the image) are given a greater weighting. Furthermore, the standard sharpness intensity STD may indicate not to perform sharpness adjustment. Where the standard sharpness intensity STD is set according to various methods as described herein, the high sharpness intensity C1 becomes larger than the standard sharpness intensity when the aperture value is set to fall within a prescribed range, in this example, where the aperture value is "8" or higher.

The high sharpness intensity C1 used during image quality adjustment when manual aperture setting is selected can be determined as the value that will produce the optimal image output results; the optimal results may be selected by comparing the image data obtained through image quality adjustment for high sharpness and the image data obtained through image quality adjustment for standard sharpness via quantitative evaluation of the image sharpness and the perceptual evaluation of the output results. For example, for the same image data, the high sharpness intensity C1 can be determined by comparing the output results where the exposure program parameter value is set to "3" (aperture priority mode) with the output results where the exposure program parameter value is set to "2" (program auto). Where the image data generating device has an operation mode in which the various parameter values used during image generation including the aperture value and the exposure can be automatically adjusted to standard values, the degree of sharpness adjustment can be checked by comparing an output result when this operation mode is set with another output result from the same original image when aperture priority mode is set. Although in this embodiment the image quality adjustment is performed using the same sharpness intensity when the exposure adjustment mode is manual mode or aperture priority mode, the sharpness intensity used during image quality adjustment may differ depending on the active exposure adjustment mode.

Figure 14:
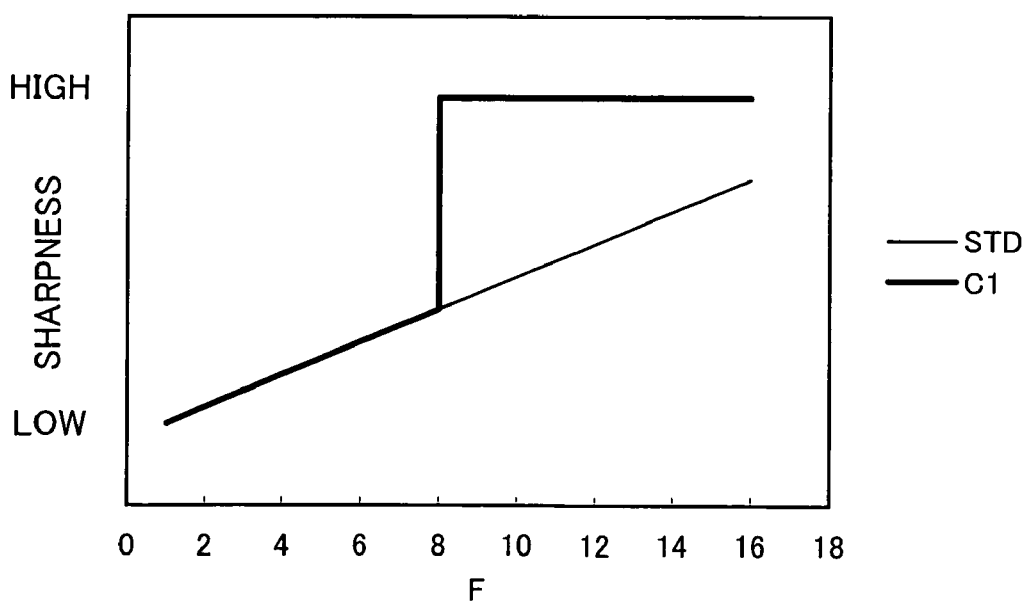
FIG. 14 is an explanatory drawing showing the relationship between the degree of sharpness adjustment and the aperture value in a second embodiment of the automatic image quality adjustment process.

G2. Second Embodiment of Automatic Image Quality Adjustment Process:

FIG. 14 is an explanatory drawing showing the relationship between the degree of sharpness adjustment and the aperture value in a second embodiment of the automatic image quality adjustment process. The horizontal and vertical axes indicate the same variables, and STD and C1 represent the same values, as in connection with FIG. 13.

In the second embodiment, unlike in the first embodiment shown in FIG. 13, the standard sharpness intensity STD increases continuously as the aperture value increases. As a result, differences in sharpness due to the aperture value can be reflected in image quality adjustment for standard sharpness as well. Furthermore, by increasing the high sharpness intensity C1 used when the aperture value equals or exceeds a prescribed value (in this example, "8") to a value larger than the standard sharpness intensity STD, the wishes of a user who desires a sharper output can be met. Another arrangement may be adopted in which the standard sharpness intensity STD increases in a stair-step, i.e. incrementally, over multiple increments, rather than continuously, as the aperture value increases.

Figure 15:
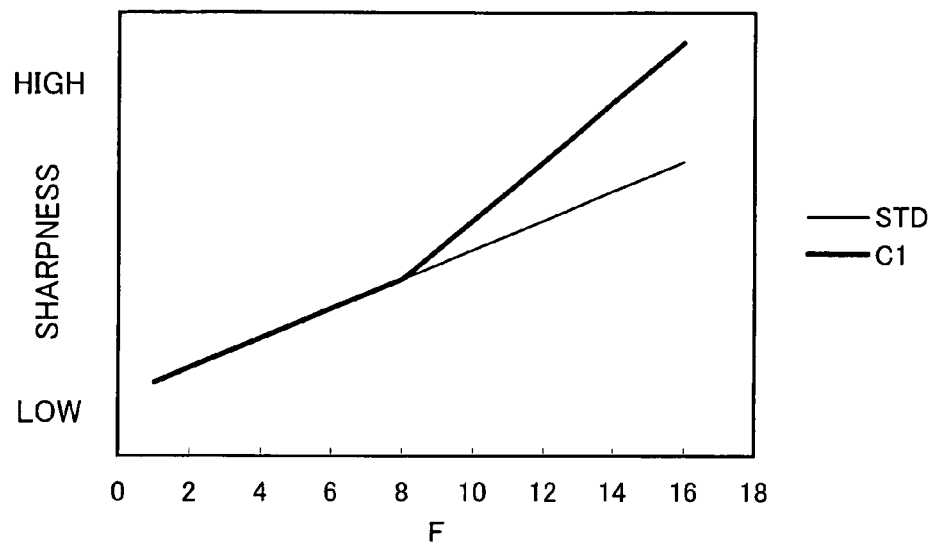
FIG. 15 is an explanatory drawing showing the relationship between the degree of sharpness adjustment and the aperture value in a third embodiment of the automatic image quality adjustment process.

G3. Third Embodiment of Automatic Image Quality Adjustment Process:

FIG. 15 is an explanatory drawing showing the relationship between the degree of sharpness adjustment and the aperture value in a third embodiment of the automatic image quality adjustment process. In the third embodiment, unlike in the first embodiment shown in FIG. 13, the high sharpness intensity C1 increases continuously as the aperture value increases where the aperture value equals or exceeds a prescribed value ("8" in this example). As a result, sharpness intensity processing can be performed with more precision based on the aperture value. Another arrangement may also be adopted in which the high sharpness intensity C1 increases incrementally over multiple increments, rather than continuously, as the aperture value increases.

G4. Fourth Embodiment of Automatic Image Quality Adjustment Process

Figure 16:
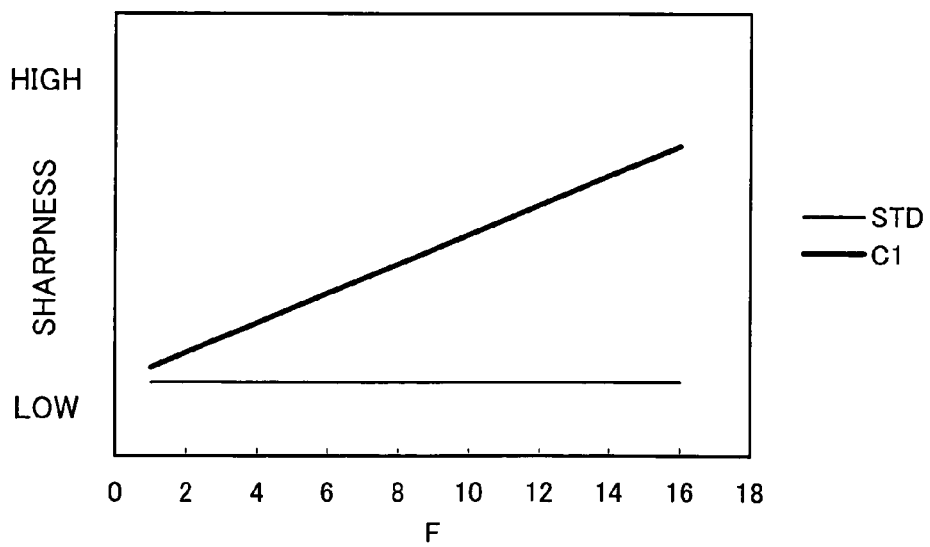
FIG. 16 is an explanatory drawing showing the relationship between the degree of sharpness adjustment and the aperture value in a fourth embodiment of the automatic image quality adjustment process.

FIG. 16 is an explanatory drawing showing the relationship between the degree of sharpness adjustment and the aperture value in a fourth embodiment of the automatic image quality adjustment process. In the fourth embodiment, unlike in the first embodiment shown in FIG. 13, the high sharpness intensity C1 increases continuously with increases in the aperture value over the entire range of possible aperture values. As a result, sharpness enhancement processing can be performed with more precision based on the aperture value. Another arrangement may also be adopted in which the high sharpness intensity C1 increases incrementally over multiple increments, rather than continuously, as the aperture value increases.

Figure 17:
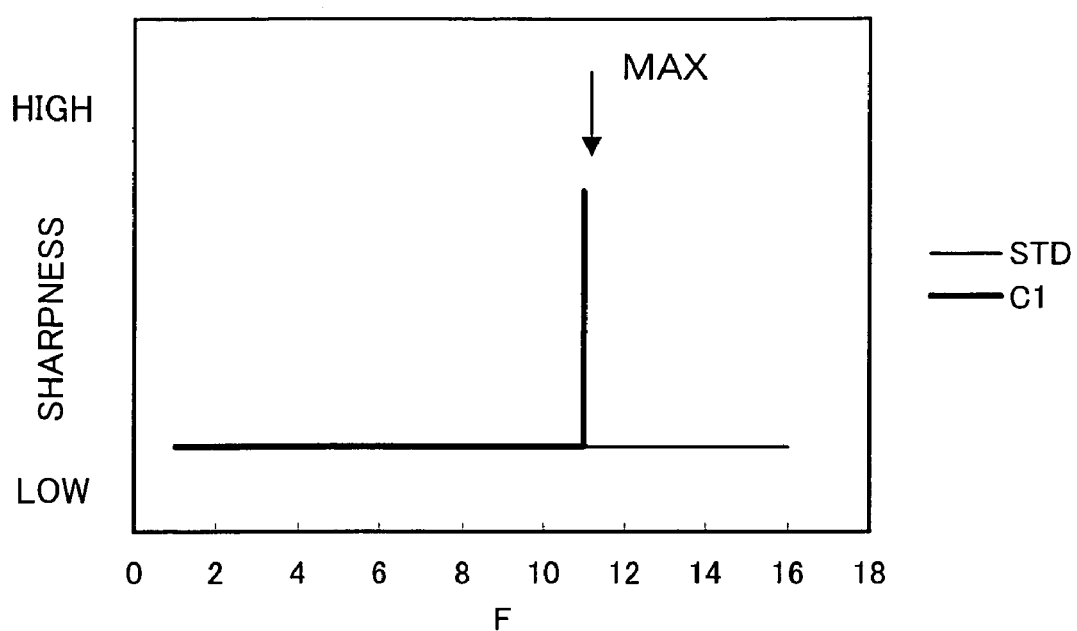
FIG. 17 is an explanatory drawing showing the relationship between the degree of sharpness adjustment and the aperture value in a fifth embodiment of the automatic image quality adjustment process.

G5. Fifth Embodiment of Automatic Image Quality Adjustment Process:

FIG. 17 is an explanatory drawing showing the relationship between the degree of sharpness adjustment and the aperture value in a fifth embodiment of the automatic image quality adjustment process. In the fifth embodiment, when the aperture value is at the maximum usable aperture value for the device that generates the image, the high sharpness intensity C1 becomes larger than the standard sharpness intensity STD. For example, in the example shown in FIG. 17, the maximum possible aperture value is 11, and where the aperture value is 11, the high sharpness intensity C1 becomes larger than the standard sharpness intensity STD. As a result, the user can output sharp images through the simple operation of setting the aperture value to the maximum value.

The maximum possible aperture value is determined in accordance with the model of the digital still camera 12 (or more generally, the model of the image data generating device). Where the image generating information GI of the image file GF includes the maximum possible aperture value, the CPU 31 (see FIG. 7) can obtain that value and adjust the sharpness intensity in accordance therewith. Alternatively, it is acceptable if an aperture value table composed of image data generating devices and the maximum possible aperture values for such devices is stored in a memory such as the PROM 32 (see FIG. 7). Where the image generating information GI includes as information pertaining to the maximum possible aperture value the manufacturer name and model name, for example, the CPU 31 can obtain the maximum possible aperture value from the aperture value table. It is also acceptable if the aperture value table is obtained online over a network or the like. This would enable the aperture value table to be updated with the most recent pertinent information. In this way, information specifying the model of the image generating device could be used as information pertaining to the maximum possible aperture value.

Figure 18:
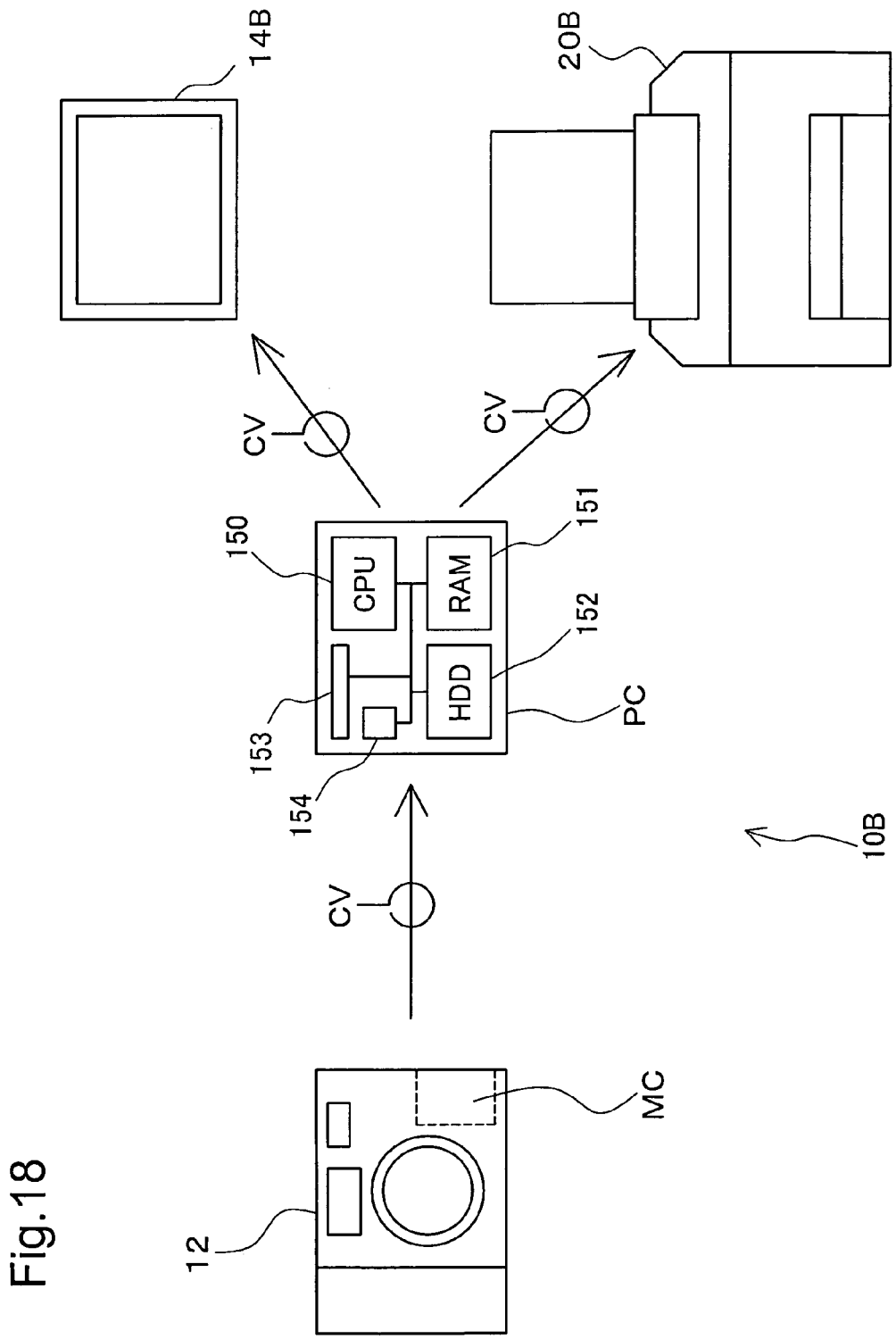
FIG. 18 is an explanatory drawing showing an example of an image data output system in which an image data processing apparatus can be used.

H. Construction of Image Data Output System Using Image Data Processing Device:

FIG. 18 is an explanatory drawing showing another image data output system including the image data processing apparatus embodying the present invention. The image data output system 10B includes a digital still camera 12 that functions as an image data generating device to generate an image file, a computer PC that executes image quality adjustment based on the image file, and a printer 20B that functions as an image data output apparatus to output images. The computer PC is an ordinary personal computer that functions here as an image data processing device. In addition to the printer 20B, the functions of an image data output apparatus may be performed by a monitor 14B such as a CRT display or an LCD display, or a projector or the like. In the description below, the printer 20B is used as the image data output apparatus. This embodiment differs from the embodiment of the image data output system described above (see FIG. 1) in that the image data processing device incorporating an image quality adjuster and the image data output device incorporating an image output unit are independent components. The computer PC that functions as the image data processing device and the printer incorporating an image output unit can be collectively referred to as the "output apparatus" below.

The image file generated by the digital still camera 12 is sent to the computer PC over the cable CV or by direct insertion of the memory card MC on which the image file is stored into the computer PC. The computer PC executes image adjustment processing of the image data based on the read-in image file. The image data generated from the image quality adjustment process is sent to the printer 20B via the cable CV and is output by the printer 20B.

The computer PC includes a CPU 150 that executes the program to implement the above image quality adjustment process, a RAM 151 in which is temporarily stored the results of calculation by the CPU 150, image data or the like, and a hard disk drive (HDD) 152 on which is stored data required for image quality adjustment processing, such as the image quality adjustment program, a lookup table, an aperture value table or the like. The CPU 150, RAM 151 and HDD 152 function collectively as an image quality adjuster. The computer PC further includes a memory card slot 153 used for mounting of the memory card MC and an I/O terminal 154 used for connecting the connecting cable from the digital still camera 12 or the like.

The image file GF generated by the digital still camera 12 is supplied to the computer PC via a cable or the memory card MC. When an image data processing application program such as an image retouching application or a printer driver is activated, the CPU 150 executes an image processing routine to process the read-in image file (see FIG. 9). It is also acceptable if the image data processing application program is activated automatically when the memory card MC is inserted in the memory card slot 153 or the digital still camera 12 is connected to the I/O terminal 154 via a cable.

Instead of being output in step S250 of the image processing routine (see FIG. 9), the image data processed by the CPU 150 is sent to the printer 20B or other image data output apparatus, and the image data output apparatus that receives the image data outputs the image.

In this embodiment, because image processing is carried out using an image quality adjuster that is included in the computer PC, an image data output apparatus that does not incorporate an image quality adjuster can be used. Alternatively, where the image data output apparatus includes an image quality adjuster, the computer PC may send the image data to the image data output apparatus without subjecting it to image processing, and image processing is performed by the image quality adjuster of the image data output apparatus.

In the embodiments described above, because image quality is adjusted using the image generating information GI included in the image file GF, high-quality output results that reflect the user's preferences can be easily obtained. In particular, image data generated after user adjustment of the aperture value can be output after appropriate sharpness adjustment.

The present invention is not limited to these embodiments, and may be implemented in various forms within the essential scope of the invention. The variations described below, for example, are possible.

Figure 19:
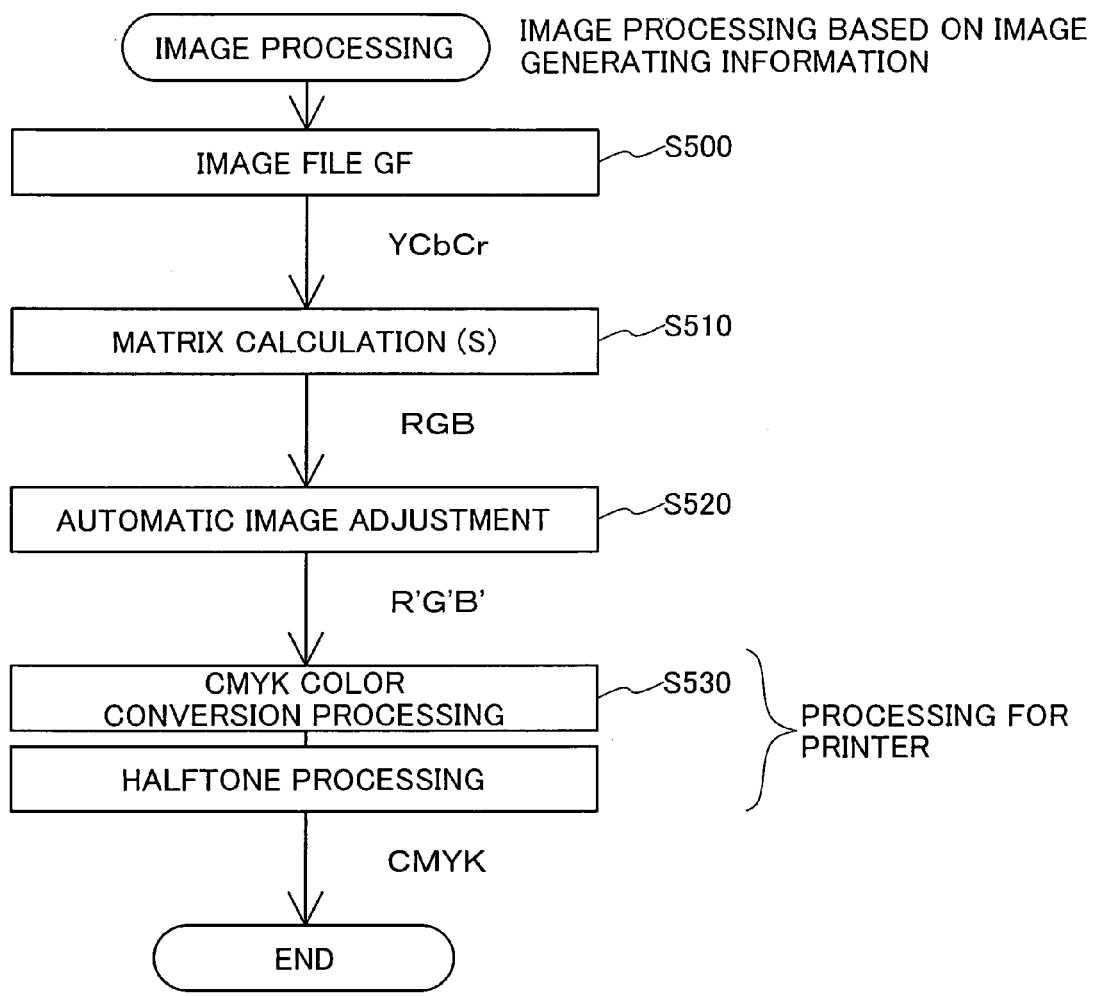
FIG. 19 is a flow chart showing an image processing routine where the color space conversion process is omitted.

I. Variations:

I1. First Variation:

Where the image file GF does not include gamma data or color space information for the image data, the color space conversion process of the image processing routine shown in FIG. 10 (steps S320 and S330) can be omitted. FIG. 19 is a flow chart showing an image processing routine in which the color space conversion process is omitted. In step 510, the image data extracted in step S500 is converted from image data based on the YCbCr color space to image data based on the RGB color space. Next, in step S520, automatic image quality adjustment is performed using the image data obtained in step S510. In step S530, CMYK color conversion processing and halftone processing are carried out for purposes of printing.

Figure 20:
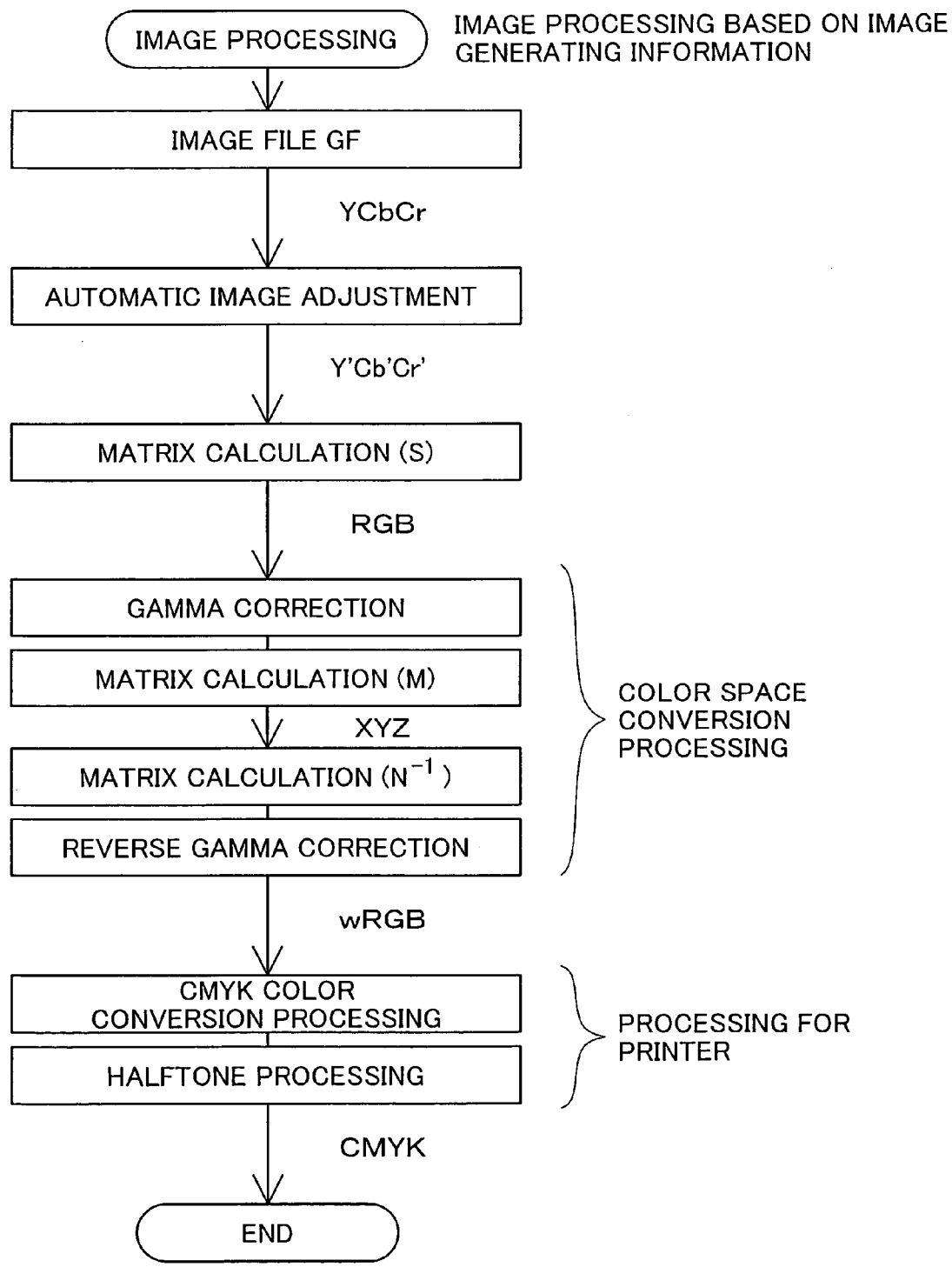
FIG. 20 is a flow chart showing a different example of an image processing routine based on image generating information.

I2. Second Variation:

In the above embodiments, the automatic image quality adjustment process was performed after color space conversion, but it is acceptable if color space conversion is performed after automatic image quality adjustment. For example, image processing may be carried out in accordance with the flow chart shown in FIG. 20.

Figure 21:
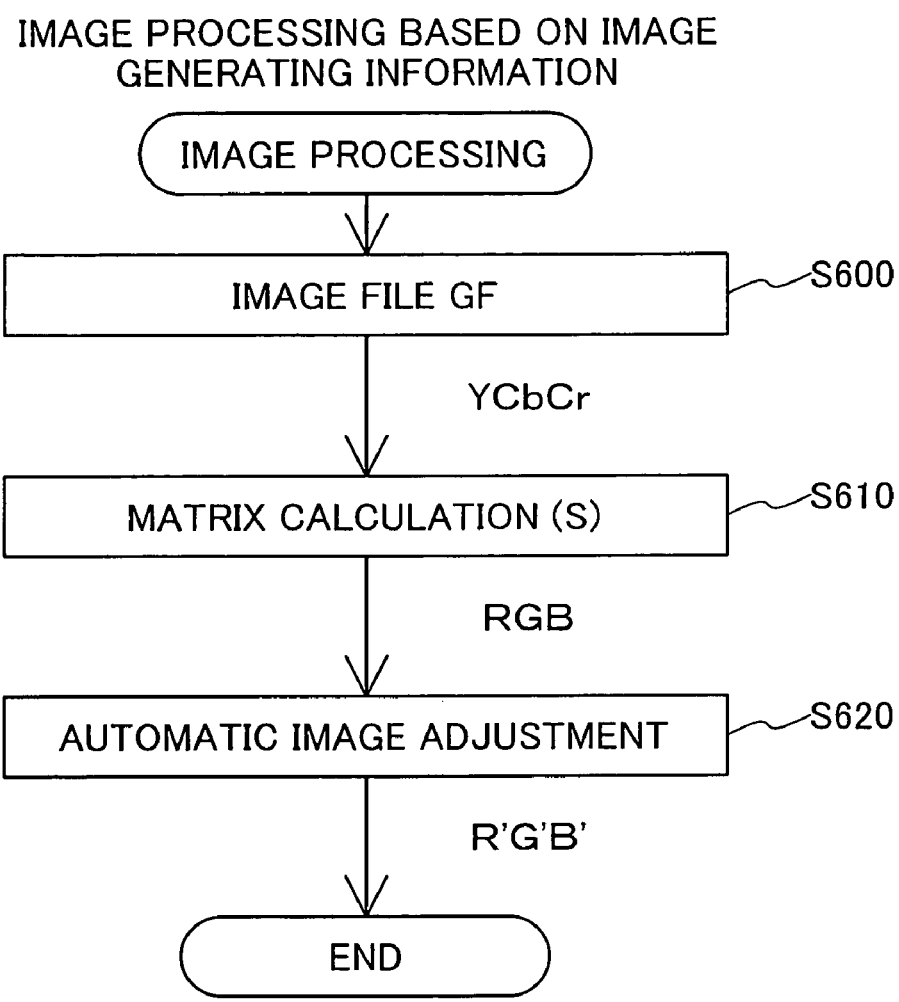
FIG. 21 is a flow chart showing still another example of an image processing routine based on image generating information.

I3. Third Variation:

In the above embodiments, a printer is used as the image output unit, but an image output unit other than a printer may be used. FIG. 21 is a flow chart showing an image processing routine based on image generating information and executed using a CRT as an image output unit. It differs from the flow chart of FIG. 10, in which the printer is used as the image output unit, in that CMYK conversion processing and halftone processing are omitted. Furthermore, because the CRT can reproduce the RGB color space of the image data obtained via matrix calculation S, color space conversion is also omitted. Where the RGB color space-based image data obtained in step S610 includes data outside the defined region of the RGB color space, step S620 is performed after such data is clipped. Where the color space that can be used by the image output unit is different from the RGB color space, color space conversion to convert the data to a color space that can be used by the image output unit is performed Oust as CMYK color conversion is carried out when a printer was used as the image output unit), and the resulting images are output by the image output unit.

I4. Fourth Variation:

In the above embodiments, images generated in the two operation modes (manual mode and aperture priority mode) where the aperture value is manually set by the user undergo identical sharpness adjustment. Alternatively, it is acceptable if image quality adjustment is carried out such that the sharpness is different for each of multiple operation modes where the aperture value is manually set. In this case as well, when the aperture value is set to fall within a prescribed range of relatively high aperture values, the sharpness intensities for the various operation modes are set to be higher than the standard sharpness intensity STD. The prescribed range of relatively high values may be different for each operation mode. This enables image quality adjustment appropriate to the operation mode to be carried out. Furthermore, where there are multiple operation modes in which the aperture value is automatically adjusted, image quality adjustment may be performed such that the sharpness intensity is different for each operation mode. For example, where the photo scene type parameter value including operation mode information (see FIG. 5) is set to human subject mode (portrait mode) in order to take a photo of a human subject, it is preferred that image quality adjustment be performed using a sharpness intensity that is lower than the standard sharpness intensity STD. This would enable a softer image of a human subject (i.e., portrait) to be output; with regard to the relationship between the sharpness intensity and the aperture value, it is acceptable if the sharpness intensity is always lower than the standard sharpness intensity STD regardless of the aperture value, or if the sharpness intensity becomes lower than the standard sharpness intensity STD only if the aperture value is set to fall within a prescribed range. Another arrangement may be adopted in which sharpness adjustment is not performed for an image taken by the human subject mode. This would enable image processing in human subject mode (portrait mode) to be simplified. Where the photo scene type parameter value is set to scenery mode for photo-taking of a natural landscape, it is preferred that image quality adjustment be performed using a sharpness that is higher than the standard sharpness intensity STD. This would enable sharper landscape images to be output. In either case, it is preferred that the degree of sharpness adjustment increase as the aperture value increases.

I5. Fifth Variation:

In the above embodiments, the exposure program or the photo scene type are used as operation mode information, but the operation mode information pertaining to the present invention is not limited to these items of information, and any information that includes information regarding the operation of the image generating device for image generation is acceptable.

I6. Sixth Variation:

The sharpness adjustment process can be executed with regard to all pixels, but it is acceptable if it is selectively executed only for pixels having a relatively large edge amount. This would enable sharpness adjustment to be performed without having to perform correction for pixels that are thought not to correspond to the edges in the image. Moreover, where the sharpness is increased during sharpness adjustment using an unsharp mask, it is acceptable if the degree of sharpness adjustment is adjusted not only by using a coefficient G but also by adjusting the size of the unsharp mask.

I7. Seventh Variation:

In the above embodiments, the image file GF is described using the example of a file in the Exif format, but the image file format of the present invention is not limited to this format. In other words, any image file that includes the image data generated by the image data generating device and the image generating information GI that describes the image data generation conditions (information) may be used. This type of file would enable the image data generated by the image data generating device to be output from the output apparatus after appropriate automatic adjustment of the image quality.

I8. Eighth Variation:

The values for the variables matrix S, $N^{-1}$ and M in the equations above are only examples, and may be changed appropriately in accordance with the color space on which the image file is based, the color space that can be used by the image output unit or the like.

I9. Ninth Variation:

In the above embodiments, the image data generating device is described using the example of the digital still camera 12, but the image file may alternatively be generated using an image data generating device such as a scanner or a digital video camera. Where the image data generating device incorporates an image quality adjuster (for example, where the digital still camera 12 incorporates an image quality adjuster), it is acceptable if sharpness adjustment processing is carried out within the image generating device and the processed image data is sent directly to an image output apparatus such as a printer or a monitor.

I10. Tenth Variation:

The above embodiments are described as an example in which the image data GD and the image generating information GI are contained in the same image file GF, but it is not essential that the image data GD and the image generating information GI be stored in the same file. In other words, it is sufficient if the image data GD and the image generating information GI are associated with each other in some way. For example, it is acceptable if association data that associates the image data GD and the image generating information GI is generated, one or more items of image data and the associated image generating information GI are stored in mutually independent files, and processing of the image data GD is performed with reference to the associated image generating information GI. In this case, although the image data GD and the image generating information GI are stored in different files, at the moment image processing that uses the image generating information GI is to begin, the image data GD and the image generating information GI form an indivisible unit, and can be considered to be substantially stored in the same file. In other words, the form in which the image data GD and the image generating information GI are associated to each other at the moment of image processing at least is included in the scope of the image file GF of this embodiment. Furthermore, moving image files stored on an optical disk medium such as a CD-ROM, CD-R, DVD-ROM, DVD-RAM or the like are included herein.

INDUSTRIAL APPLICABLITY

This invention may be applied in a personal computer, printer, facsimile machine, digital camera or other type of image processing apparatus.

What is claimed is:

1. An image processing method of performing image processing using image data generated by an image generating device and image generating information that is associated with the image data and that includes at least aperture information and operation mode information at the time of generation of the image data, the method comprising:

adjusting sharpness of the image data based on the aperture information and the operation mode information included in the image generating information, wherein the adjusting includes obtaining an aperture value used at the time of the image data generation from the aperture information, and determining whether or not the aperture value was set manually by a user, and wherein in case that it is determined that the aperture value was set manually and in case that the aperture value was set to a value in a prescribed range, strong sharpness adjustment is performed so that a degree of sharpness adjustment is higher than a value which would be taken in case that the aperture value were set under the standard photo-taking conditions of the image generating device.

2. An image processing method according to claim 1, wherein the adjusting includes determining based on the operation mode information whether or not to carry out image quality adjustment to adjust the sharpness of the image data, and determining based on the aperture information a degree of sharpness adjustment to be performed in case that it is determined that the image quality adjustment is to be carried out.

3. An image processing method according to claim 1, wherein adjusting includes determining based on the operation mode information whether or not an operation mode for the image generating unit at the time of the image data generation is portrait mode, and the sharpness adjustment is not carried out in case that the operation mode is determined to be portrait mode.

4. An image processing method according to claim 1, wherein the adjusting includes determining based on the operation mode information whether or not an operation mode for the image generating unit at the time of the image data generation is portrait mode, and in case that the operation mode is determined to be portrait mode, weak sharpness adjustment is carried out where a degree of sharpness adjustment is lower than a value which would be taken in case that the aperture value were set under standard photo-taking conditions of the image generating unit.

5. An image processing method according to claim 1, wherein the strong sharpness adjustment is carried out in case that the aperture value equals or exceeds a prescribed value.

6. An image processing method according to claim 1, wherein the degree of sharpness adjustment performed during the strong sharpness adjustment increases as the aperture value increases.

7. An image processing method according to claim 1, wherein the image generating information further includes information pertaining to a maximum possible aperture value of the image data generating unit that generated the image data, and the strong sharpness adjustment is performed in case that the aperture value is at the maximum possible aperture value.

8. An image processing device for performing image processing using image data generated by an image generating device and image generating information that is associated with the image data and that includes at least aperture information and operation mode information at the time of generation of the image data, the device comprising:

an image quality adjuster configured to adjust sharpness of the image data based on the aperture information and the operation mode information included in the image generating information, wherein the image quality adjuster is further configured to obtain an aperture value used at the time of the image data generation from the aperture information, and to determine whether or not the aperture value was set manually by a user, and wherein in case that it is determined that the aperture value was set manually and in case that the aperture value was set to a value in a prescribed range, strong sharpness adjustment is performed so that a degree of sharpness adjustment is higher than a value which would be taken in case that the aperture value were set under the standard photo-taking conditions of the image generating device.

9. A computer-readable storage medium having stored thereon a computer-executable program or instructions for performing image processing using image data generated by an image generating device and image generating information that is associated with the image data and that includes at least aperture information and operation mode information at the time of generation of the image data, the computer-executable program or instructions comprising:

a program or instructions for causing a computer to adjust sharpness of the image data based on the aperture information and the operation mode information included in the image generating information, wherein the program or instructions further cause the computer to obtain an aperture value used at the time of the image data generation from the aperture information, and to determine whether or not the aperture value was set manually by a user, and wherein in case that it is determined that the aperture value was set manually and in case that the aperture value was set to a value in a prescribed range, strong sharpness adjustment is performed so that a degree of sharpness adjustment is higher than a value which would be taken in case that the aperture value were set under the standard phototaking conditions of the image generating device.

* * * * *